(12) United States Patent
Beveridge

(10) Patent No.: US 10,190,766 B2
(45) Date of Patent: *Jan. 29, 2019

(54) MODEL-BASED LOAD DEMAND CONTROL

(71) Applicant: EMERSON PROCESS MANAGEMENT POWER & WATER SOLUTIONS, INC., Pittsburgh, PA (US)

(72) Inventor: Robert Allen Beveridge, New Kensington, PA (US)

(73) Assignee: EMERSON PROCESS MANAGEMENT POWER & WATER SOLUTIONS, INC., Pittsburgh, PA (US)

( * ) Notice: Subject to any disclaimer, the term of this patent is extended or adjusted under 35 U.S.C. 154(b) by 364 days.

This patent is subject to a terminal disclaimer.

(21) Appl. No.: 14/887,039

(22) Filed: Oct. 19, 2015

(65) Prior Publication Data

US 2016/0040871 A1 Feb. 11, 2016

Related U.S. Application Data

(63) Continuation of application No. 13/285,072, filed on Oct. 31, 2011, now Pat. No. 9,163,828.

(51) Int. Cl.
*F22B 35/00* (2006.01)
*G05B 11/42* (2006.01)
(Continued)

(52) U.S. Cl.
CPC .............. *F22B 35/00* (2013.01); *F01K 13/02* (2013.01); *G05B 11/42* (2013.01); *G05B 13/04* (2013.01);
(Continued)

(58) Field of Classification Search
CPC ....... F01K 13/02; F22B 35/00; G05B 13/042; G05B 11/42; G05B 13/041; G05B 17/02; G05B 13/04; G05B 11/16; G05B 11/18
See application file for complete search history.

(56) References Cited

U.S. PATENT DOCUMENTS

| 2,003,419 A | 6/1935 | Artsay |
| 2,911,789 A | 11/1959 | Baker |

(Continued)

FOREIGN PATENT DOCUMENTS

| GB | 1 486 570 A | 9/1977 |
| GB | 2 454 357 A | 5/2009 |
| GB | 2 482 954 A | 2/2012 |

OTHER PUBLICATIONS

Un-Chul Moon and Kwang Y. Lee, "Step-Response Model Development for Dynamic Matrix Control of a Drum-Type Boiler—Turbine System", Jun. 2, 2009, IEEE.*

(Continued)

*Primary Examiner* — Charles R Kasenge
(74) *Attorney, Agent, or Firm* — Marshall, Gerstein & Borun LLP

(57) ABSTRACT

Embodiments of methods and systems for controlling a load generated by a power generating system may include controlling at least a portion of the system using model-based control techniques. The model-based control techniques may include a dynamic matrix controller (DMC) that receives a load demand and a process variable as inputs and generates a control signal based on the inputs and a stored model. The model may be configured based on parametric testing, and may be modifiable. Other inputs may also be used to determine the control signal. In an embodiment, a turbine is controlled by a first DMC and a boiler is controlled by a second DMC, and the control signals generated by the first and the second DMCs are used in conjunction to control (Continued)

the generated load. Techniques to move the power generating system from Proportional-Integral-Derivative based control to model-based control are also disclosed.

18 Claims, 8 Drawing Sheets

(51) Int. Cl.
 *G05B 13/04* (2006.01)
 *G05B 17/02* (2006.01)
 *F01K 13/02* (2006.01)
 *G05B 11/18* (2006.01)
 *G05B 11/16* (2006.01)

(52) U.S. Cl.
 CPC ......... *G05B 13/041* (2013.01); *G05B 13/042* (2013.01); *G05B 17/02* (2013.01); *G05B 11/16* (2013.01); *G05B 11/18* (2013.01)

(56) References Cited

U.S. PATENT DOCUMENTS

| | | |
|---|---|---|
| 3,016,711 A | 1/1962 | Shakeshaft |
| 3,244,898 A | 4/1966 | Hickox |
| 3,550,562 A | 12/1970 | Strohmeyer, Jr. |
| 3,588,265 A | 6/1971 | Berry |
| 3,837,167 A | 9/1974 | Durrant et al. |
| 3,873,817 A | 3/1975 | Liang |
| 3,875,384 A | 4/1975 | Davis |
| 3,878,401 A | 4/1975 | Ronnen |
| 3,879,616 A | 4/1975 | Baker et al. |
| 3,898,441 A | 8/1975 | Davis et al. |
| 3,911,286 A | 10/1975 | Uram |
| 3,930,367 A | 1/1976 | Gasparoli |
| 3,934,128 A | 1/1976 | Uram |
| 3,937,934 A | 2/1976 | Pasemann |
| 3,939,328 A | 2/1976 | Davis |
| 3,948,043 A | 4/1976 | Martz |
| 3,955,358 A | 5/1976 | Martz et al. |
| 3,959,635 A | 5/1976 | Tanco |
| 3,973,391 A | 8/1976 | Reed et al. |
| 4,013,877 A | 3/1977 | Uram et al. |
| 4,025,765 A | 5/1977 | Giras et al. |
| 4,027,145 A | 5/1977 | McDonald et al. |
| 4,028,884 A | 6/1977 | Martz et al. |
| 4,029,255 A | 6/1977 | Heiser et al. |
| 4,029,952 A | 6/1977 | Giras et al. |
| 4,031,372 A | 6/1977 | Davis |
| 4,035,624 A | 7/1977 | Lardi |
| 4,037,088 A | 7/1977 | Davis et al. |
| 4,047,005 A | 9/1977 | Heiser et al. |
| 4,053,746 A | 10/1977 | Braytenbah et al. |
| 4,053,747 A | 10/1977 | Davis |
| 4,057,715 A | 11/1977 | Jones et al. |
| 4,061,533 A | 12/1977 | Durrant |
| 4,064,699 A | 12/1977 | Martz |
| 4,086,773 A | 5/1978 | Kanegae et al. |
| 4,090,065 A | 5/1978 | Braytenbah et al. |
| 4,168,608 A | 9/1979 | Uram |
| 4,184,324 A | 1/1980 | Kiscaden et al. |
| 4,195,231 A | 3/1980 | Reed et al. |
| 4,201,924 A | 5/1980 | Uram |
| 4,205,380 A | 5/1980 | Braytenbah |
| 4,220,869 A | 9/1980 | Uram |
| 4,222,229 A | 9/1980 | Uram |
| 4,227,093 A | 10/1980 | Uram et al. |
| 4,236,220 A | 11/1980 | Kogami et al. |
| 4,245,162 A | 1/1981 | Ronnen et al. |
| 4,246,491 A | 1/1981 | Waldron et al. |
| 4,258,424 A | 3/1981 | Giras et al. |
| 4,267,458 A | 5/1981 | Uram et al. |
| 4,270,055 A | 5/1981 | Ronnen et al. |
| 4,333,310 A | 6/1982 | Uram |
| 4,353,204 A | 10/1982 | Arakawa |
| 4,427,896 A | 1/1984 | Waldron |
| 4,445,180 A | 4/1984 | Davis et al. |
| 4,471,620 A | 9/1984 | Binstock et al. |
| 4,578,944 A | 4/1986 | Martens et al. |
| 4,589,255 A | 5/1986 | Martens et al. |
| 4,619,224 A | 10/1986 | Takita et al. |
| 4,637,348 A | 1/1987 | Fukayama |
| 4,644,479 A | 2/1987 | Kemper et al. |
| 4,687,946 A | 8/1987 | Jones |
| 4,888,953 A | 12/1989 | Fukayama et al. |
| 4,975,238 A | 12/1990 | Regan et al. |
| 5,091,844 A | 2/1992 | Waltz |
| 5,237,816 A | 8/1993 | Duffy et al. |
| 5,268,835 A | 12/1993 | Miyagaki et al. |
| 5,413,175 A | 5/1995 | Edmunds |
| 5,453,925 A | 9/1995 | Wojsznis et al. |
| 5,485,754 A | 1/1996 | Harpster |
| 5,517,424 A | 5/1996 | Marcelle et al. |
| 5,568,378 A | 10/1996 | Wojsznis |
| 5,594,858 A | 1/1997 | Blevins |
| 5,646,513 A | 7/1997 | Riggio, Jr. |
| 5,752,411 A | 5/1998 | Harpster |
| 5,841,652 A | 11/1998 | Sanchez |
| 5,943,865 A | 8/1999 | Cohen |
| 6,109,019 A | 8/2000 | Sugishita |
| 6,223,520 B1 | 5/2001 | Kita |
| 6,445,962 B1 | 9/2002 | Blevins et al. |
| 6,445,963 B1 | 9/2002 | Blevins et al. |
| 6,453,308 B1 | 9/2002 | Zhao et al. |
| 6,459,939 B1 | 10/2002 | Hugo |
| 6,501,998 B1 | 12/2002 | Pfeiffer |
| 6,510,351 B1 | 1/2003 | Blevins et al. |
| 6,577,908 B1 | 6/2003 | Wojsznis et al. |
| 6,609,361 B2 | 8/2003 | Vugdelija |
| 6,681,155 B1 * | 1/2004 | Fujita ................ G05B 13/042 60/660 |
| 6,721,609 B1 | 4/2004 | Wojsznis et al. |
| 6,847,954 B1 | 1/2005 | Wojsznis et al. |
| 6,901,300 B2 | 5/2005 | Blevins et al. |
| 6,970,750 B2 | 11/2005 | Wojsznis et al. |
| 7,043,311 B2 | 5/2006 | Nixon et al. |
| 7,110,835 B2 | 9/2006 | Blevins et al. |
| 7,113,834 B2 | 9/2006 | Wojsznis et al. |
| 7,117,052 B2 | 10/2006 | Lucas et al. |
| 7,242,989 B2 | 7/2007 | Blevins et al. |
| 7,272,454 B2 | 9/2007 | Wojsznis et al. |
| 7,317,953 B2 | 1/2008 | Wojsznis et al. |
| 7,337,022 B2 | 2/2008 | Wojsznis et al. |
| 7,346,472 B1 | 3/2008 | Moskowitz et al. |
| 7,376,472 B2 | 5/2008 | Wojsznis et al. |
| 7,421,354 B2 | 9/2008 | Brunell |
| 7,451,004 B2 | 11/2008 | Thiele et al. |
| 7,496,041 B2 | 2/2009 | Blevins et al. |
| 7,526,347 B2 | 4/2009 | Lucas et al. |
| 7,551,969 B2 | 6/2009 | Wojsznis et al. |
| 7,587,252 B2 | 9/2009 | Blevins et al. |
| 7,596,198 B1 | 9/2009 | Srinivasan |
| 7,620,460 B2 | 11/2009 | Blevins et al. |
| 7,647,126 B2 | 1/2010 | Blevins et al. |
| 7,702,409 B2 | 4/2010 | Lucas et al. |
| 7,729,789 B2 | 6/2010 | Blevins et al. |
| 7,729,792 B2 | 6/2010 | Lucas et al. |
| 7,738,975 B2 | 6/2010 | Denison et al. |
| 7,826,908 B2 | 11/2010 | Cheng et al. |
| 7,840,287 B2 | 11/2010 | Wojsznis et al. |
| 7,856,281 B2 | 12/2010 | Thiele et al. |
| 7,877,154 B2 | 1/2011 | Blevins et al. |
| 7,922,155 B2 | 4/2011 | Havlena |
| 7,930,045 B2 | 4/2011 | Cheng |
| 7,945,339 B2 | 5/2011 | Blevins et al. |
| 7,971,052 B2 | 6/2011 | Lucas et al. |
| 8,046,096 B2 | 10/2011 | Denison et al. |
| 8,055,358 B2 | 11/2011 | Blevins et al. |
| 8,060,834 B2 | 11/2011 | Lucas et al. |
| 8,127,241 B2 | 2/2012 | Blevins et al. |
| 8,135,481 B2 | 3/2012 | Blevins et al. |
| 8,185,217 B2 | 5/2012 | Thiele |
| 8,200,346 B2 | 6/2012 | Thiele |
| 8,280,533 B2 | 10/2012 | Wojsznis et al. |

(56) References Cited

U.S. PATENT DOCUMENTS

| | | |
|---|---|---|
| 8,326,666 B2 | 12/2012 | Caldwell et al. |
| 8,433,450 B2 | 4/2013 | Francino et al. |
| 8,473,087 B2 | 6/2013 | Lucas et al. |
| 8,509,926 B2 | 8/2013 | Blevins et al. |
| 9,110,453 B2* | 8/2015 | Cheng ............... G05B 13/027 |
| 9,217,565 B2* | 12/2015 | Beveridge ............... F01K 13/02 |
| 9,335,042 B2* | 5/2016 | Beveridge ............... F22G 5/12 |
| 9,447,963 B2* | 9/2016 | Beveridge ............... F22G 5/12 |
| 2001/0021900 A1 | 9/2001 | Kassmann |
| 2001/0032026 A1* | 10/2001 | Shigemasa ............. G05B 11/32 700/53 |
| 2002/0071975 A1 | 6/2002 | Shimazu |
| 2002/0120352 A1 | 8/2002 | Stothert et al. |
| 2003/0028265 A1 | 2/2003 | Martin |
| 2003/0033056 A1* | 2/2003 | Kusaka ............... G05B 15/02 700/275 |
| 2003/0046939 A1 | 3/2003 | Hyakutake et al. |
| 2003/0120359 A1 | 6/2003 | O'Leary et al. |
| 2004/0050072 A1 | 3/2004 | Palfy et al. |
| 2004/0050076 A1 | 3/2004 | Palfy et al. |
| 2004/0093124 A1* | 5/2004 | Havlena ............... F22B 35/008 700/291 |
| 2004/0111187 A1* | 6/2004 | Kusaka ............... G05B 15/02 700/286 |
| 2004/0244729 A1 | 12/2004 | Lefebvre et al. |
| 2005/0096872 A1 | 5/2005 | Blevins et al. |
| 2005/0136303 A1 | 6/2005 | Kobayshi et al. |
| 2006/0052902 A1 | 3/2006 | Lefebvre et al. |
| 2006/0191896 A1 | 8/2006 | Cheng et al. |
| 2006/0224534 A1 | 10/2006 | Hartman et al. |
| 2006/0283406 A1 | 12/2006 | Francino et al. |
| 2007/0042768 A1 | 2/2007 | Gazeley |
| 2007/0055392 A1* | 3/2007 | D'Amato ............. G05B 13/048 700/44 |
| 2007/0129917 A1 | 6/2007 | Blevins et al. |
| 2007/0151243 A1 | 7/2007 | Stewart |
| 2007/0174225 A1 | 7/2007 | Blevins et al. |
| 2007/0198104 A1 | 8/2007 | Sayyarrodsari et al. |
| 2007/0208549 A1 | 9/2007 | Blevins et al. |
| 2007/0288487 A1* | 12/2007 | Song ............... H04L 12/2818 |
| 2008/0016647 A1 | 1/2008 | Francino et al. |
| 2008/0029261 A1 | 2/2008 | Kephart et al. |
| 2008/0077257 A1 | 3/2008 | Peterson et al. |
| 2008/0082180 A1 | 4/2008 | Blevins et al. |
| 2008/0125881 A1 | 5/2008 | Grott et al. |
| 2008/0141953 A1 | 6/2008 | Hirayama et al. |
| 2008/0148713 A1 | 6/2008 | White et al. |
| 2008/0244975 A1 | 10/2008 | Johnston |
| 2008/0288198 A1 | 11/2008 | Francino et al. |
| 2008/0302102 A1 | 12/2008 | Cheng et al. |
| 2009/0012653 A1 | 1/2009 | Cheng et al. |
| 2009/0016609 A1 | 1/2009 | Zakrzewski et al. |
| 2009/0040367 A1 | 2/2009 | Zakrzewski et al. |
| 2009/0056036 A1 | 3/2009 | Herkle et al. |
| 2009/0063113 A1 | 3/2009 | Francino et al. |
| 2009/0089247 A1 | 4/2009 | Blevins et al. |
| 2009/0118873 A1* | 5/2009 | Cheng ............... G05B 13/021 700/296 |
| 2009/0173078 A1* | 7/2009 | Thatcher ............... F02C 9/20 60/773 |
| 2010/0062381 A1 | 3/2010 | Gross et al. |
| 2010/0077970 A1 | 4/2010 | Kumar et al. |
| 2010/0100248 A1* | 4/2010 | Minto ............... F01D 11/20 700/287 |
| 2010/0162700 A1 | 7/2010 | Birnbaum et al. |
| 2010/0185336 A1* | 7/2010 | Rovnyak ............... H02J 3/38 700/287 |
| 2010/0236241 A1 | 9/2010 | Kumar et al. |
| 2010/0241249 A1 | 9/2010 | Jia et al. |
| 2010/0318934 A1 | 12/2010 | Blevins et al. |
| 2011/0040390 A1 | 2/2011 | Blevins et al. |
| 2011/0066298 A1* | 3/2011 | Francino ............... F01K 9/003 700/290 |
| 2011/0131017 A1 | 6/2011 | Cheng et al. |
| 2011/0131455 A1 | 6/2011 | Law et al. |
| 2011/0148214 A1* | 6/2011 | Dahlen ............... H02J 3/40 307/87 |
| 2011/0218782 A1 | 9/2011 | Coughran et al. |
| 2011/0224808 A1 | 9/2011 | Lucas et al. |
| 2011/0230980 A1 | 9/2011 | Hammack et al. |
| 2011/0245937 A1 | 10/2011 | Rawson et al. |
| 2011/0288660 A1 | 11/2011 | Wojsznis et al. |
| 2011/0288786 A1 | 11/2011 | Blevins et al. |
| 2011/0288837 A1 | 11/2011 | Blevins et al. |
| 2012/0010757 A1 | 1/2012 | Francino et al. |
| 2012/0010758 A1 | 1/2012 | Francino et al. |
| 2012/0030852 A1 | 2/2012 | Anscher |
| 2012/0036852 A1* | 2/2012 | Beveridge ............... F22G 5/12 60/653 |
| 2012/0040298 A1* | 2/2012 | Beveridge ............... F22G 5/12 432/13 |
| 2012/0040299 A1* | 2/2012 | Beveridge ............... F01K 13/02 432/13 |
| 2012/0123601 A1* | 5/2012 | Long ............... H02J 3/24 700/287 |
| 2012/0259437 A1* | 10/2012 | Cheng ............... G05B 13/027 700/45 |
| 2013/0018516 A1* | 1/2013 | Chee ............... H02J 3/383 700/287 |
| 2013/0085795 A1 | 4/2013 | Caldwell et al. |
| 2013/0110298 A1 | 5/2013 | Beveridge |

OTHER PUBLICATIONS

Office Action for Chinese Application No. 201210437709.9, dated May 4, 2016.
Beveridge et al., U.S. Appl. No. 12/856,998, filed Aug. 16, 2010.
Beveridge et al., U.S. Appl. No. 13/022,324, filed Feb. 7, 2011.
Beveridge et al., U.S. Appl. No. 13/022,237, filed Feb. 7, 2011.
Search Report for Application No. GB1219482.5, dated Feb. 5, 2013.
Moon et al., Step-response model development for dynamic matrix control of a drum-type boiler-turbine system, IEEE Transactions on Energy Conversion, vol. 24, 423-430(2009).
Qin, S. Joe and Thomas A. Badgwell, "An Overview of Industrial Model Predictive Control Technology," *AIChE Conference*, 1996.
Search Report for Application No. GB1112940.0, dated Nov. 9, 2011.
Search Report for Application No. GB1113709.8, dated Nov. 16, 2011.
Search Report for Application No. GB1113708.0, dated Nov. 16, 2011.
Office Action for Canadian Application No. 2,793,983, dated Nov. 22, 2017.
Office Action for India Application No. 4495/CHE/2012, dated Sep. 24, 2018.

\* cited by examiner

MODEL-BASED LOAD DEMAND CONTROL

RELATED APPLICATIONS

This application is a continuation of U.S. patent application Ser. No. 13/285,072, entitled "Model-Based Load Demand Control," filed Oct. 31, 2011, the entire disclosure of which is hereby expressly incorporated by reference herein.

TECHNICAL FIELD

This patent relates generally to the control of process and power generating equipment and, in particular, to the implementation of model-based load demand control to be used in reducing the control response time of power generating equipment/process or other plant equipment with similar response characteristics.

BACKGROUND

A variety of industrial as well as non-industrial applications use fuel burning boilers which typically operate to convert chemical energy into thermal energy by burning one of various types of fuels, such as coal, gas, oil, waste material, etc. An exemplary use of fuel burning boilers may be in thermal power generators, wherein fuel burning furnaces generate steam from water traveling through a number of pipes and tubes within a boiler, and the generated steam may be then used to operate one or more steam turbines to generate electricity. The electrical or power output of a thermal power generator may be a function of the amount of heat generated in a boiler, wherein the amount of heat may be directly determined by the amount of fuel consumed (e.g., burned) per hour, for example.

A typical steam generating system used in a power plant may include a boiler having a superheater section (having one or more sub-sections) in which steam may be produced and may be then provided to and used within a first, typically high pressure, steam turbine. To increase the efficiency of the system, the steam exiting this first steam turbine may then be reheated in a reheater section of the boiler, which may include one or more subsections, and the reheated steam may be then provided to a second, typically lower pressure steam turbine. However, as may be known, both the furnace/boiler section of the power system as well as the turbine section of the power system must be controlled in a coordinated manner to produce a desired amount of power.

Moreover, as may be known, the steam turbines of a power plant are typically run at different operating levels at different times to produce different amounts of electricity or power based on variable energy or load demands provided to the power plant. For example, in many cases, a power plant may be tied into an electrical power distribution network, sometimes called a power grid, and provides a designated amount of power to the power grid. In this case, a power grid manager or control authority typically manages the power grid to keep the voltage levels on the power grid at constant or near-constant levels (that may be, within rated levels) and to provide a consistent supply of power based on the current demand for electricity (power) placed on the power grid by power consumers. Of course, the grid manager typically plans for heavier use and thus greater power requirements during certain times of the days than others, and during certain days of the week and year than others, and may run one or more optimization routines to determine the optimal amount and type of power that needs to be generated at any particular time by the various power plants connected to the grid to meet the current or expected overall power demands on the power grid.

As part of this process, the grid manager typically sends power or load demand requirements (also called load demand set points) to each of the power plants supplying power to the power grid, wherein the power demand requirements or load demand set points specify the amount of power that each particular power plant may be to provide onto the power grid at any particular time. Of course, to effect proper control of the power grid, the grid manager may send new load demand set points for the different power plants connected to the power grid at any time, to account for expected and/or unexpected changes in power being supplied to or consumed from the power grid. For example, the grid manager may change the load demand set point for a particular power plant in response to expected or unexpected changes in the demand (which may be typically higher during normal business hours and on weekdays, than at night and on weekends). Likewise, the grid manager may change the load demand set point for a particular power plant in response to an unexpected or expected reduction in the supply of power on the grid, such as that caused by one or more power units at a particular power plant failing unexpectedly or being brought off-line for normal or scheduled maintenance.

In any event, while the grid manager may provide or change the load demand set points for particular power plants at any time, the power plants themselves cannot generally increase or decrease the amount of power being supplied to the power grid instantaneously, because power generation equipment typically exhibits a significant lag in response time due to the physical characteristics of these systems. For example, to increase the power output of a steam turbine based power generation system, it may be necessary to change the amount of fuel being spent within the system, to thereby increase the steam pressure or temperature of the water within the boiler of the system, all of which takes a finite and non-trivial amount of time. Thus, generally speaking, power plants can only ramp up or ramp down the amount of power being supplied to the grid at a particular rate, which may be based on the specifics of the power generating equipment within the plant. Thus, when the grid manager changes the load demand set point for any particular power plant, the grid manager typically provides both a new target load demand (to be reached at some particular time in the future) and a ramp rate specifying the manner in which the load demand set point changes over the time between the current time and the particular time in the future. Generally speaking, the ramp rate indicates the manner in which the load demand set point for the power plant may be to ramp up or down (change) over time between the current load demand set point and the target load demand set point.

In power plants that use a boiler to produce power, a power plant controller typically uses a feedforward controller to increase or decrease the output power in response to a change in the load demand, which may be made either locally or by a remote dispatch (e.g., by the grid manager). To change output power of the plant, the load demand set point (which may be expressed as a power demand, e.g., megawatts, or as a percentage of capacity) may be typically converted to a unit load index which serves as a master feedforward demand signal for both the boiler and the turbine of each power generator unit. The boiler master demand signal then becomes the basis for producing both a master fuel control signal and a master air control signal used to control the fuel (e.g., coal) and the air flow provided to the furnace of the boiler.

Due to the sluggish nature of a boiler response however, the boiler master (or fuel master) demand may be typically computed with a derivative component (i.e., a "lead" component from a frequency domain transfer function perspective), or a so-called "kicker," which increases the response rate of the boiler, instead of using a simple linear function of the load demand index (a straight line) as the feedforward control signal. An immediate drawback of using a derivative action as a basis for adding a lead component or a "kicker" when computing the feedforward control signal may be that this derivative component risks creating a large overshoot and swing in both the unit load and the steam temperature of the boiler when the change in the load demand set point may be large and/or the load demand set point ramps or ranges over a long period of time. This problem may be especially prominent for relatively fast response boilers (for example, cyclone boilers).

To solve the problem of overshoot and swing, it may be known to derive the unit load index based feedforward control signal to include a derivative "kicking" action based on the difference between the current load demand set point and the final target load demand set point, such that the derivative kicking action may be stronger or more prominent at the beginning of the load demand ramp (when the difference between the current load demand set point and the target load demand set point may be above a preset threshold) and the derivative action weakens significantly (or may be halted altogether) near the end of the ramp (i.e., when the difference between the current load demand set point and the target load demand set point may be less than a preset threshold). However, this strategy has significant shortcomings in that (1) this technique loses the derivative "kicking" action when the load demand ramp range may be relatively small (i.e., when the difference between a current load demand set point and the final target load demand set point may be initially small to begin with) and (2) this technique has to rely on the knowledge of the final target load demand set point to determine when to remove or lessen the derivative "kicking" action within the feedforward control signal.

Unfortunately, many changes made to the load demand set point by, for example, a grid manager, are relatively small in nature and, in many cases, may not be large enough to initiate any derivative "kicking" action when a change in load demand may be initially made by the grid manager (which may be the time that the derivative "kicking" action may be most beneficial). Additionally, in many instances, the actual final or target load demand set point value may be unknown to the control system of the process plant producing the power because the remote dispatch center or grid manager only sends an incremental pulse signal to the local plant increasing the load demand set point, without informing the plant of the final target load demand to which the plant may be moving. In this case, the addition of the derivative "kicking" action may be difficult or impossible to apply with any certainty or effectiveness as the plant must estimate a target or final load demand set point (which may lead to over-aggressive control) or must assume that the target load demand set point may be simply the next value sent by the dispatcher (which typically leads to under-aggressive control).

SUMMARY

Embodiments of a method of controlling a load generated by a power generating system may include receiving a signal indicative of a load demand at an input of a dynamic matrix controller. The method may additionally include determining a value of a control signal based on the signal indicative of the load demand and a model stored in a memory of the dynamic matrix controller, and generating the control signal. The method may also include controlling the load generated by the power generating system based on the control signal. In an embodiment, the control signal may be determined further based on a current value of a process variable and a desired value of the process variable. In an embodiment, more than one model-based controlled entity may each generate a respective control signal, and the resulting one or more generated control signals may be combined to control the load generated by the power generating system.

Embodiments of a method of controlling a load of a power generating system may include generating, by a first dynamic matrix controller, a first control signal based on a load demand and a first model stored in a memory of the first dynamic matrix controller, and generating, by a second dynamic matrix controller, a second control signal based on the load demand and a second model stored in a memory of the second dynamic matrix controller. The method may further include controlling the load of the power generating system based on the first control signal and on the second control signal. The first dynamic matrix controller may correspond to a turbine and the second dynamic matrix controller may correspond to a boiler, in an embodiment. In some embodiments, the method may include initiating a cessation of a Proportional-Integral-Derivative (PID) control technique prior to the dynamic matrix controller generating a control signal.

Embodiments of a power generating system may include a dynamic matrix controller. The dynamic matrix controller may include an input to receive a signal indicative of a load demand for the power generating system, a memory storing a model, a dynamic matrix control routine configured to determine a value of a control signal based on the model and a value of the load demand, and an output to provide the control signal to control a load generated by the power generating system. The model may be determined or configured based on parametric testing of at least a portion of the power generating system, and the model may be modifiable. In some embodiments, the dynamic matrix controller may include one or more additional inputs, and the dynamic matrix control routine may determine the value of the control signal further based on the one or more additional inputs.

DETAILED DESCRIPTION

Figure 1:
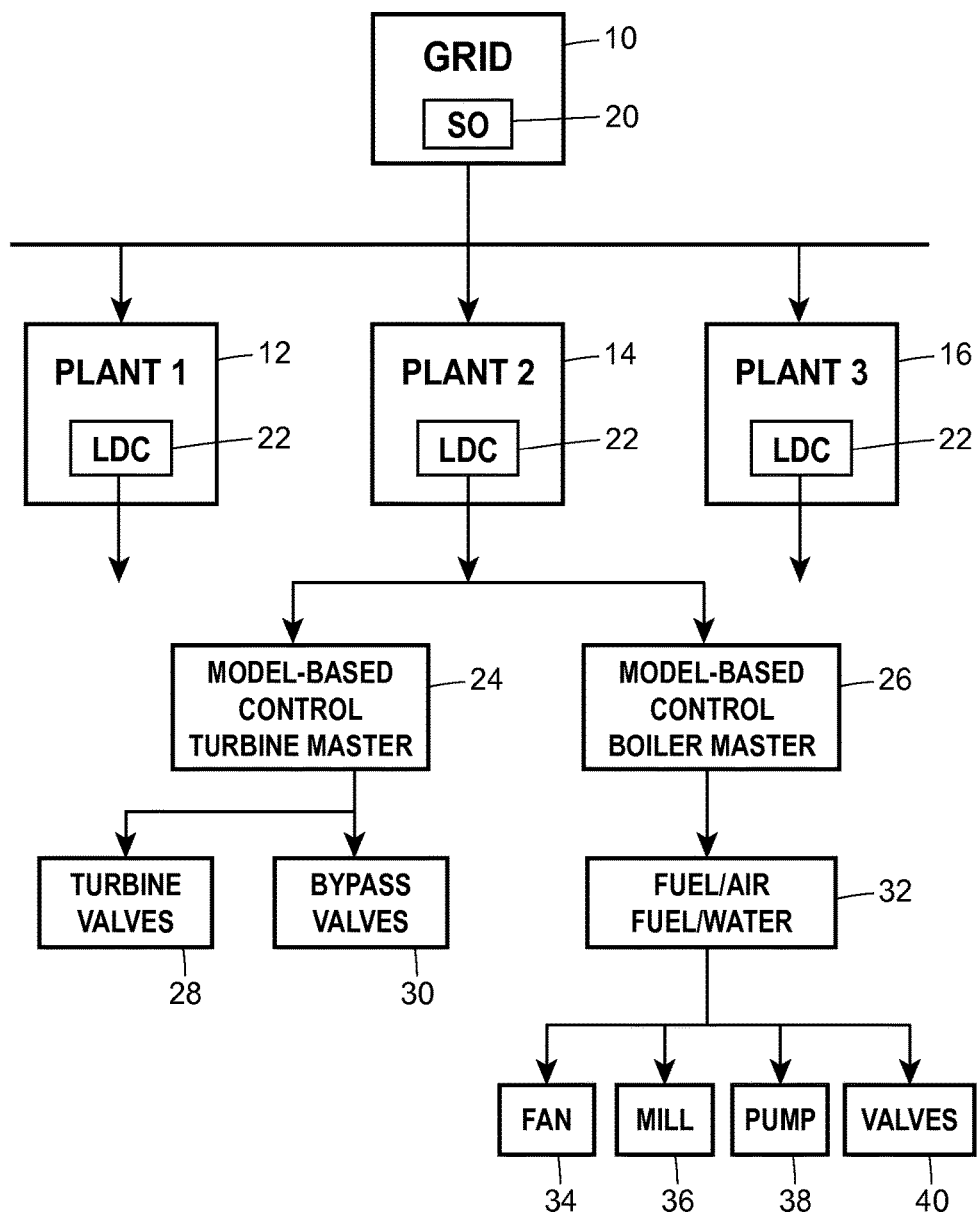
FIG. 1 illustrates a block diagram of a power grid having numerous power generating plants connected thereto, at least one of which includes model-based load demand control.

Referring now to FIG. 1, a power grid 10 may be electrically and communicatively connected to each of a number of power plants 12, 14 and 16, as well as to additional power plants not shown in FIG. 1, wherein the power plants 12, 14, 16 may operate to provide power to the power grid 10. As used herein, the terms "power plant," "power generating plant," "power generating system," "load generating plant," and "load generating system" are used interchangeably.

As will be understood, the power on the power grid 10 may be used or may be consumed by customers or other power consumers (not shown in FIG. 1) connected to the power grid 10. Generally speaking, a grid manager, indicated in FIG. 1 as a system operator (SO) 20, may be connected to and may manage the power on the grid 10 by determining and then sending different load demand set point signals to each of the plants 12, 14 and 16. These load demand set point signals may be generated by the system operator 20 in any known or desired manner and may, for example, be generated using an optimization technique. Generally speaking, these load demand set point signals may indicate the amount of power (generally in terms of megawatts) to be provided by each plant 12, 14 and 16 to the power grid 10 at any particular time. More particularly, the system operator 20 may maintain the voltage level on the power grid 10 at a rated level and may assure that enough power (both active and reactive) may be provided to the power grid 10 to satisfy the current and/or the projected future demand on the power grid 10 at any particular time by generating and sending load demand set point signals to each of the plants 12, 14 and 16.

Unfortunately, as is generally known, the power plants 12, 14, 16 cannot instantaneously change the amount of power being provided to the power grid 10, especially if the power plants 12, 14, 16 use slow-reacting types of power generating equipment, such as pulverized coal-fired power generating units. Thus, the system operator 20, when providing each power plant 12, 14, 16 with a load demand set point signal, generally does so by providing a new target load demand set point to be reached at some point in the future and a rate at which the power plant may be to ramp up to the target load demand set point (thereby specifying a set of load demand set point signals to be used between the current time and the time at which the target load demand set point signal may be to be reached). Thus, the system operator 20 may provide a power plant, for example, the power plant 14, with a new target load demand set point to be reached at a particular time in the future and a ramp rate at which the power output by the power plant 14 will change over the time between the current time and the time at which the target load demand set point may be to be reached. Generally speaking, the ramp rate provided by the system operator 20 to any particular power plant 12, 14, 16 may be based on (i.e., may be equal to or less than) the maximum allowed or specified rate at which these plants may change their power output, which may be provided by the plants 12, 14, 16 to the system operator 20 when the plants 12, 14, 16 come on-line or are commissioned or signed up for regulation control. In other circumstances, however, the system operator 20 may provide each power plant 12, 14, 16 with a new load demand set point at numerous periodic times (such as once every minute, once every 10 minutes, etc.) with the new load demand at each time being calculated to be within the specified or allowable ramp rate for each power plant.

In any event, referring again to FIG. 1, the system operator 20 may provide, periodically or at non-fixed times, new load demand set point signals to each of the plants 10, 12, 14, and these load demand set point signals may include load demand set points which may be provided to a load demand computer (LDC) 22 located within each of the plants 12, 14, 16. The LDCs 22 within the plants 12, 14 and 16 may use the load demand set points as primary control signals to be used to control the individual power generating units within the plant. As illustrated for the plant 14, which may be, in this be case, a boiler operated steam turbine power plant, an LCD 22 uses the received load demand set point signal to produce a load demand index, which may be then provided to a turbine master control unit 24 and to a boiler master control unit 26 within the plant 14. As shown in FIG. 1, the turbine master control unit 24 may use the LDC index and model-based control to control turbine valves 28 and bypass valves 30, as well as additional or other turbine equipment used to generate electricity based on steam produced by the boiler system of the plant. In a similar manner, the boiler master control unit 26 may use the LDC index provided by the LDC 22 and model-based control to compute a fuel flow, air flow, and/or water flow demand signal 32 used within the boiler system to control the operations of fans 34, mills 36, pumps 38, valves 40, as well as other equipment within the boiler system to operate the boiler to produce the amount of steam pressure needed to drive the turbines at a particular power generating capacity.

Model-based control techniques used in a power generating system to control a generated load (such as those used in conjunction with the turbine master 24 and the boiler master 26) may provide significant advantages over traditionally utilized control techniques such as Proportional-Integral-Derivative (PID) control. Boilers and other components of power generating systems have inherently sluggish response times. As PID control techniques generally are reactionary, the slow component response is exacerbated. Accordingly, only after the occurrence of a discrepancy between a setpoint and a process variable (e.g., throttle pressure, unit load, megawatts, etc.) does correctional action begin to take place. Even with additional enhancements to PID control such as feed forward and "kicker" components, the response time to ramp up to a desired load demand may still not be sufficiently precise or efficient, thus adding to operational costs and cutting into the profits of the power generating system.

On the other hand, model-based control of various power generating plant sections (e.g., the turbine and/or the boiler) may provide increased efficiency and precision as well as decreased ramp-up time to generate a desired load. In an embodiment, the model-based control of the turbine master control unit 24 and/or of the boiler master control unit 26 may each include a respective dynamic matrix controller having one or more respective models stored thereon that are used to generate control signals. Given a desired load demand, the dynamic matrix controller(s) may control the turbine master 24 and/or the boiler master 26 directly to a desired configuration based on the one or more respective models, rather than controlling the turbine master 24 and/or the boiler master 26 by performing time-consuming linear calculations of discrepancies and reactionary hunting for manipulated variables, as required by PID control techniques. As such, correctional action may be instantaneous rather than reactionary. Further, the step-like response of the model-based control techniques disclosed herein may allow the load generating system to raise and lower the generated load with less overshoot and less undershoot. Still further, the one or more models used in model-based control techniques may be ready for immediate use after they are loaded, whereas PID control techniques require considerable tuning before they are ready for use. For at least these reasons, generated loads may be more efficiently and more timely dispatched, thus resulting in significant cost savings.

Figure 2:
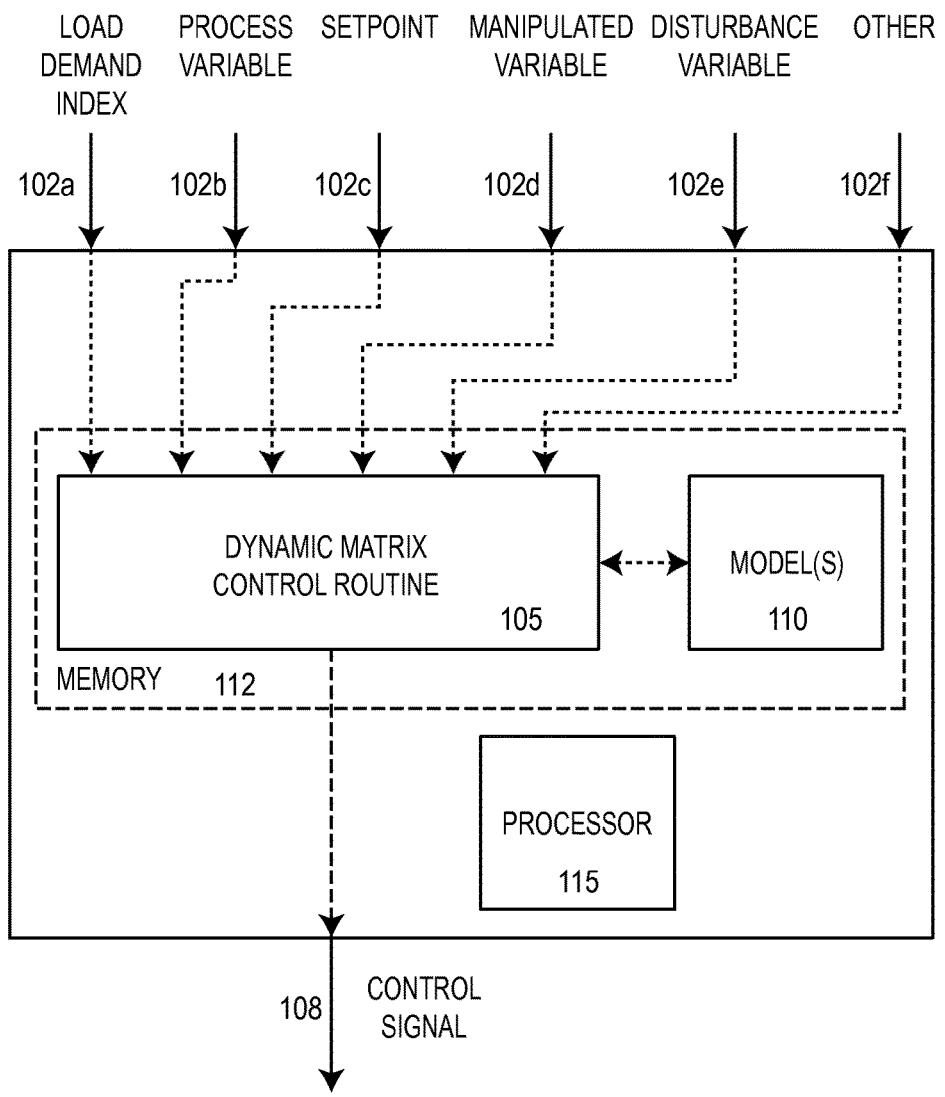
FIG. 2 illustrates a block diagram of a dynamic matrix controller (DMC) used to provide model-based load control in a power generating plant or system.

FIG. 2 illustrates an embodiment of a general block diagram of a dynamic matrix controller (DMC) 100 that may be used to provide model-based load control in a power generating system or plant, such as the plant 12, 14 or 16 of FIG. 1. For example, a particular instance of the DMC 100 shown in FIG. 2 may be included in or may operate in conjunction with the turbine master control unit 24, and a same or different instance of the DMC 100 may be included in or may operate in conjunction with the boiler master control unit 26. In an embodiment, the turbine master 24 includes a first instance of the dynamic matrix controller 100, and the boiler master 26 includes a different instance of the dynamic matrix controller 100.

The dynamic matrix controller 100 may include one or more inputs 102a-102f to receive various signals from the power generating system. In an embodiment, the DMC 100 includes an input 102a at which a signal indicative of a load demand may be received. For example, the input 102a may receive a signal corresponding to an LDC index from the LDC 22.

The DMC 100 may receive, in some embodiments, one or more additional inputs 102b-102f. In an embodiment, the DMC 100 may include an input 102b via which a signal indicative of a current value of a process variable used in the load generating system may be received, and may include an input 102c via which a signal indicative of a desired value of the process variable (e.g., the setpoint of the process variable) may be received. For example, the input 102b may receive a signal corresponding to a current value of a throttle pressure; a fuel flow, air flow to the system and/or water flow to the system; a unit load; an amount of generated power (e.g., in megawatts or some other suitable unit of measure); or another suitable process variable.

In an embodiment, the DMC 100 includes an input 102d at which a signal indicative of a current value of a manipulated variable used in the load generating system may be received. For example, the input 102d may receive a signal corresponding to a current value that represents a valve position, a damper position or some other manipulated variable that may affect control of a load generated by the power generating system. In an embodiment, the manipulated variable whose value is received at the input 102d may correspond to one or more of the valves 28, 30 or 40, the fan 34, the mill 36, the pump 38, or some other entity of the load generating system. In an embodiment, more than one signal corresponding to more than one manipulated variable may be received at the DMC 100.

In some embodiments, an input 102e of the DMC 100 may receive a signal indicative of a disturbance variable. A disturbance variable may correspond to, for example, an amount of soot, a steam temperature, an amount of burner tilt, or any other disturbance that may affect control of a load generated by the power generating system. In an embodiment, one or more other inputs 102f of the DMC 100 may receive one or more other signals.

At the DMC 100, based on the values of one or more signals received at the inputs 102a-102f, a dynamic matrix control routine 105 may determine a value of a control signal 108. In particular, the dynamic matrix control routine 105 may determine the value of the control signal 108 based on a model 110 that may be represented by the function $$D(i_1, i_2, \ldots, i_n) = C,$$

where $i_x$ corresponds to a value of a signal received at an x-th input of the DMC 100, and c corresponds to a value of the control signal 108 generated by the DMC 100. In an example, when an instance of the DMC model 100 is included in the turbine master 24 of FIG. 1, the control signal 108 may be provided to control one or more turbine valves 28, one or more bypass valves 30, and/or other entities in the power generating plant that affect control of the turbine. In another example, when a different instance of the DMC model 100 is included in the boiler master 26 of FIG. 1, the control signal 108 may be provided to control a fuel flow, an air flow and/or a water flow 32, one or more fans 34, mills 36, pumps 38, valves 30, or other entities within the power generating plant that affect control of the boiler.

At a minimum, the dynamic matrix control routine 105 may determine the control signal value c based on a value of the load demand (e.g., the LDC index generated by the LDC 22) received at the input 102a. In some embodiments, in addition to the LDC index, the control signal value c may be determined based on a current value of a process variable used in the power generating system received at the input 102b and a value of a setpoint or desired value of the process variable received at the input 102c. As such, the model 110 may define a relationship between a particular load demand, a particular current value of a process variable, and the process variable setpoint. In some embodiments, the model 110 may define a relationship between multiple load demand values, multiple possible current values of the process variables, and the process variable setpoint.

In some embodiments, in addition to the LDC index, the control signal value c may be determined based on a current value of a manipulated variable used in the power generating system received at the input 102d, a current value of a disturbance variable received at the input 102e, and/or a value of some other signal 102f. Generally, the model 110 may define one or more relationships between various values of load demand and various values of signals that may be received (either alone or in combination) via the inputs 102b-102c of the dynamic matrix controller 100.

Figure 3:
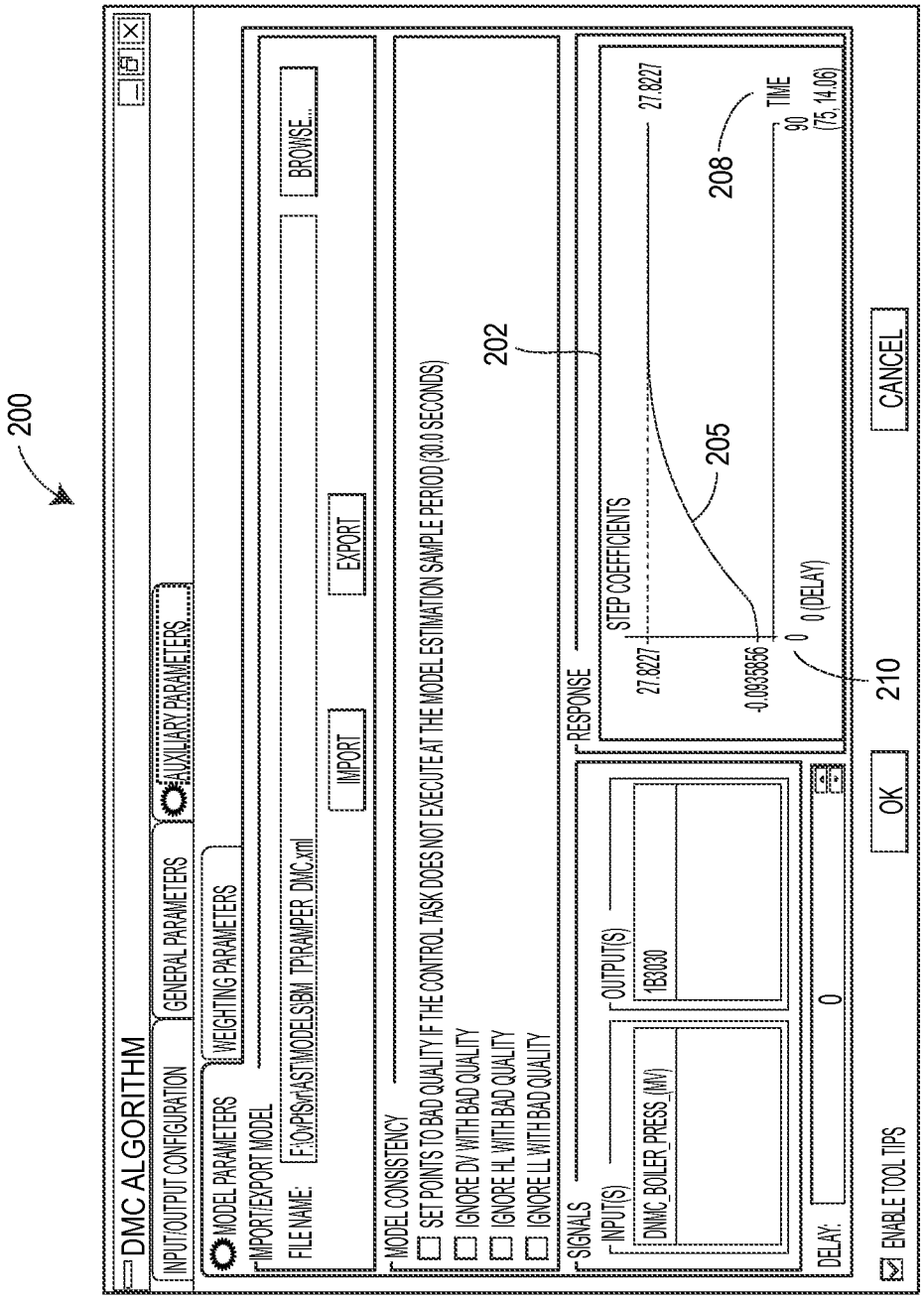
FIG. 3 illustrates an example screen shot of a user interface of a power generating plant or system displaying a model that may be included in the dynamic matrix controller of FIG. 2.

In an embodiment, the function $D(i_1, i_2, \ldots i_n) = c$ that is executed by the dynamic matrix control routine 105 may be correspond to one or more models 110 stored at the DMC 100. An example of the model 110 is shown in FIG. 3. FIG. 3 illustrates an example screen shot 200 displayed on a user interface of a power generating plant or system. The screen shot 200 includes an example model 202 that may be included in the dynamic matrix controller of FIG. 2. The model 202 may be an example of an embodiment of the model 110 of FIG. 2, for instance, and the model 202 may be included in an instance of a dynamic matrix controller 100 used in conjunction with the turbine master 24.

The model 202 may be configured or generated based on parametric testing of the load or power generating system. In the example shown in FIG. 3, the model 202 is depicted as a two-dimensional plot of a process response 205 over time 208 showing the response of throttle pressure at the turbine at a given initial system load when boiler output is changed during parametric testing. To determine the model 202, parametric testing was performed at the given initial system load. During testing, while the load generating system was operating in a steady-state at the given initial system load, a defined increase in the output of the boiler was demanded of the load generating system at the time 210. The curve 205 corresponds to the parametric data obtained during the testing process. In particular, the curve 205 corresponds to the response of throttle pressure of the turbine over time 208 that occurred due to the requested demand in boiler output at the initial time 210. As such, the plot 205 depicts the process response of the turbine for a defined system change at a known, initial steady-state load.

The parametric testing may be repeated to obtain data to determine, generate or configure one or more models 110 that are more accurate and complete. Generally, parametric testing may be performed for combinations of various values of initial steady-state loads and various values of types of system changes to determine various process responses. For example, parametric testing may be performed for different initial steady-state loads and/or for different changes in boiler output demands. Additionally or alternatively, parametric testing may performed to gather parametric data for process responses other than throttle pressure. Still additionally or alternatively, parametric testing may be performed for system changes other than boiler output demand.

Referring to the example shown in FIG. 3, data obtained from multiple parametric tests may be used to determine, configure and/or generate one or more models 110 corresponding to the turbine, including the model 202. The one or more models 110 may describe the behavior of different process responses of the turbine at various loads and various system changes. The one or more models 110 may then be loaded into or otherwise made available for use by an instance of the dynamic matrix control routine 105 in a DMC 100 of FIG. 2 that is used in conjunction with the turbine master 24.

In a similar manner, one or more parametric tests may be performed to obtain parametric data corresponding to various process responses of the boiler. The obtained parametric data may be used to determine, configure and/or generate one or more models 110 corresponding to the boiler. The one or more models 110 may then be loaded into or otherwise made available for use by an instance of the dynamic matrix control routine 105 in a DMC 100 that is used in conjunction with the boiler master 26.

In FIG. 3, the embodiment of the model 202 depicts the model 110 as a two-dimensional line graph 205. It is understood, however, that the model 110 may be depicted in any desired form, such as a graph other than a two-dimensional plot, a mathematical model or formula, an arrangement of data, a pictorial representation, or other suitable form. In some embodiments, at least a portion of the model may be selected and may be presented for viewing on a user interface. In some embodiments, a single model 110 may be represented over multiple display views.

Furthermore, although the embodiment illustrated in FIG. 3 displays a single model 110 representing response of throttle pressure that is included in the DMC 100, in other embodiments, more than one model 110 may be included in the DMC 100. Each of the more than one models 110 may be displayed, either by itself or in conjunction with other models. For example, each model may correspond to a different range of loads generated by the power generating system or plant. In another example, each model may correspond to a different process response. One or more appropriate models 110 may be selected for use in generating the control signal 108, in an embodiment.

Turning back to FIG. 2, the dynamic matrix control routine 105 that determines the value of the control signal 108 may include a set of computer executable instructions that are stored on a memory 112 of the DMC 100. The memory 112 may include one or more non-transitory, tangible, computer-readable media. For example, the memory 112 may include one or more program memories for permanently storing data related to the computer executable instructions, and one or more random-access memories for temporarily storing data related to the computer executable instructions. The memory 112 may be implemented as one or more semiconductor memories, magnetically readable memories, optically readable memories, and/or other tangible, non-transitory computer-readable storage media, for example. The memory 112 may be accessible to a processor 115 so that the processor 115 may execute the set of instructions on the memory corresponding to the dynamic matrix control routine 105.

The model 110 may be stored on a same memory 112 as the dynamic matrix control routine 105 or on a different memory (not shown) that is locally or remotely accessible to the dynamic matrix control routine 105. In conjunction with the execution of the dynamic matrix control routine 105, the model 110 may be accessed by the dynamic matrix control routine 105.

In an embodiment, the model 110 may be updated to reflect updated or desired parametric data. For example, the model 110 may be automatically modified as plant data (e.g., process control data, measurements, etc.) changes in real-time, the model 110 may be automatically modified when a threshold is reached, the model 110 may be automatically modified at predetermined time intervals, and/or the model 110 may be modified based on a user command or instruction. An updated, modified model may be stored in the memory 112 so that subsequent, updated control signals 108 are determined based on the modified model.

Figure 4:
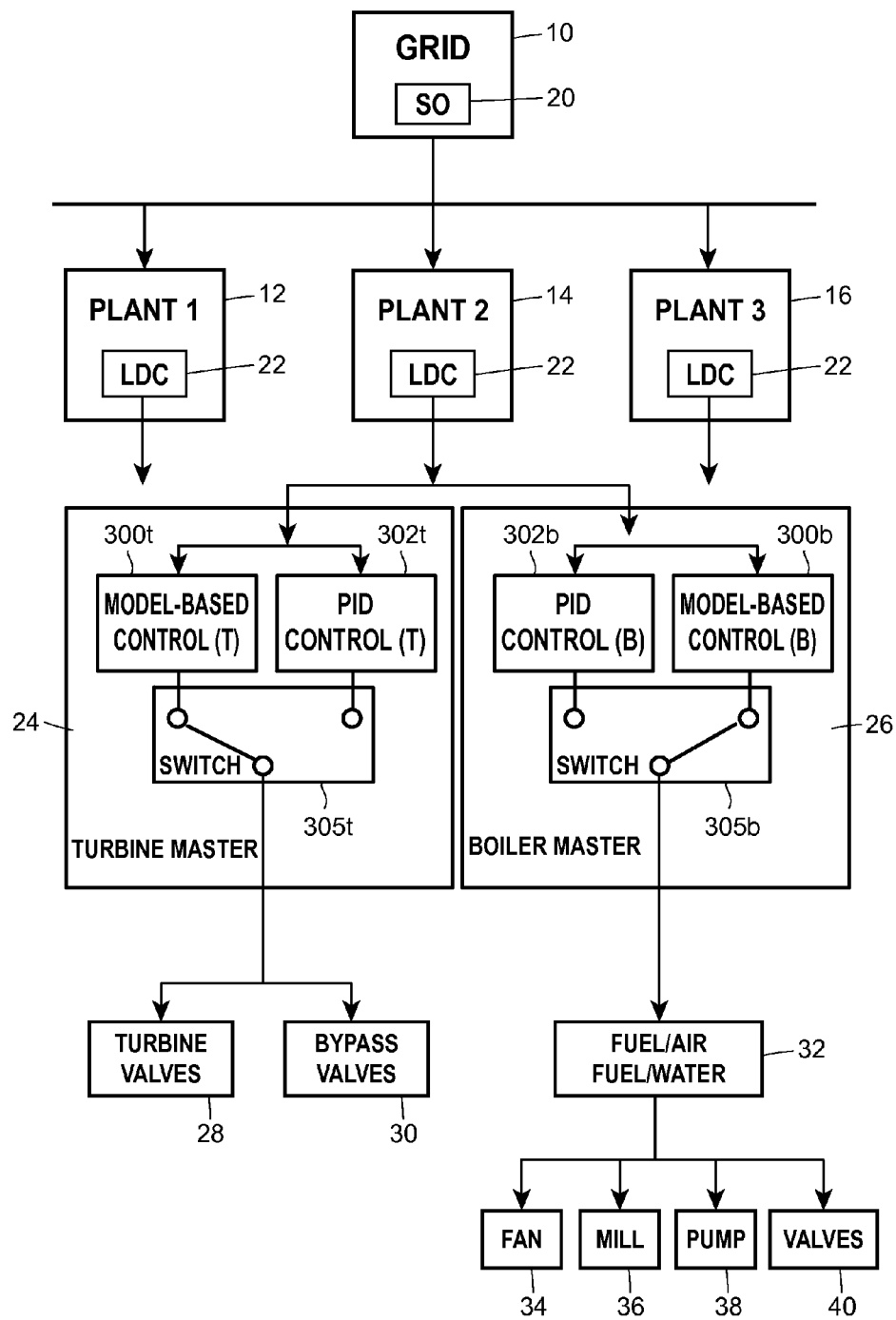
FIG. 4 illustrates a block diagram of a power grid having numerous power generating plants connected thereto, at least one of which may be switched between model-based load demand control and Proportional-Integral-Derivative (PID) control.

FIG. 4 illustrates a block diagram of an embodiment of the power grid 10 of FIG. 1 where at least one of the plants 12, 14, and 16 may be switched between model-based load demand control and PID control. In FIG. 4, only the plant 14 is shown as having the capability of being switched between model-based load demand control and PID control, but the techniques illustrated and discussed for the plant 14 may be implemented in the plant 12 and/or the plant 16. Further, although FIG. 4 illustrates both the turbine master 24 and the boiler master 26 as including the capability of switching between model-based and PID based control, in some embodiments, only one of the turbine master 24 or the boiler master 26 may include the capability of switching between model-based and PID based control.

Still further, at least a portion of the techniques illustrated and discussed with respect to FIG. 4 may be used in conjunction with the dynamic matrix controller 100 of FIG. 2, with other model-based controllers, or with other types of model-based control. For ease of discussion and not for limiting purposes, though, the description of FIG. 4 below includes references to the DMC 100 of FIG. 2.

FIG. 4 illustrates embodiments of the model-based turbine master 24 and the model-based boiler master 26 that each support switching between model-based and PID based control respectively therein. With regard to the turbine master 24 of FIG. 4, the turbine master 24 may include a model-based control entity, apparatus or system 300*t*, a PID control entity, apparatus or system 302*t*, and a switch 305*t* that is configured to activate one of the model-based control entity 300*t* or the PID control entity 302*t*. Similarly, the boiler master 26 of FIG. 4 may include a model-based control entity, apparatus or system 300*b*, a PID control entity, apparatus or system 302*b*, and a switch 305*b* configured to activate one of the model-based control entity 300*b* or the PID control entity 302*b*. It is understood that the switches 305*t* and 305*b* each need not be mechanical switches, but may each be a programmable switch, an electronically activated switch, or a switch that is activated in any suitable manner.

In an embodiment, both model-based control entities 300*t*, 300*b* are activated while both PID control entities 302*t*, 302*b* are deactivated. In an embodiment, only one of the model-based control entities 300*t*, 300*b* is activated while the other is deactivated. In an example, to controllably move the power generating system from operating under PID control techniques 302*t*, 302*b* to model-based control techniques 300*t*, 300*b*, a first switch (e.g., one of the switch 305*t* and the switch 305*b*) may transfer its connection from PID control to model-based control, and then sequentially, the other switch may transfer its connection from PID control to model-based control. In some embodiments, the activation and deactivation of the switches is based on user input. In some embodiments, the activation and deactivation of the switches is automatically performed.

With regard to the model-based control entities, apparatuses or systems 300*t* and 300*b* illustrated in FIG. 4, each of the model-based control entities 300*t* and 300*b* may include a respective instance of the DMC 100 that utilizes a respective set of one or more models 110. For example, the model-based control entity 300*t* corresponding to the turbine master 24 may include a first instance of the DMC 100 that receives a first set of signals (e.g., via the input 102*a* and one or more of inputs 102*b*-102*f*), and that further includes a first set of one or more respective models 110 that correspond to parametric testing of the turbine. In an embodiment, the model-based control entity 300*b* corresponding to the boiler master 26 may include a second instance of the DMC 100 that includes a second set of signals (e.g., via the input 102*a* and one or more inputs 102*b*-102*f*), and that further includes a second set of one or more respective models 110 that correspond to parametric testing of the boiler. Typically, the first and the second instances of the DMC 100 may differ, and the first and the second sets of models and signals may also differ, but these differences are not required. Furthermore, the model-based control entity 300*t* and the model-based control entity 300*b* are not each limited to being an embodiment of the DMC 100. Generally, any known model-based control strategy or entity may be included in the model-based control entity 300*t* and/or in the model-based control entity 300*b*. In an embodiment, the model-based control strategy used in the model-based control entity 300*t* may be different than that used in the model-based control entity 300*b*.

Figure 5:
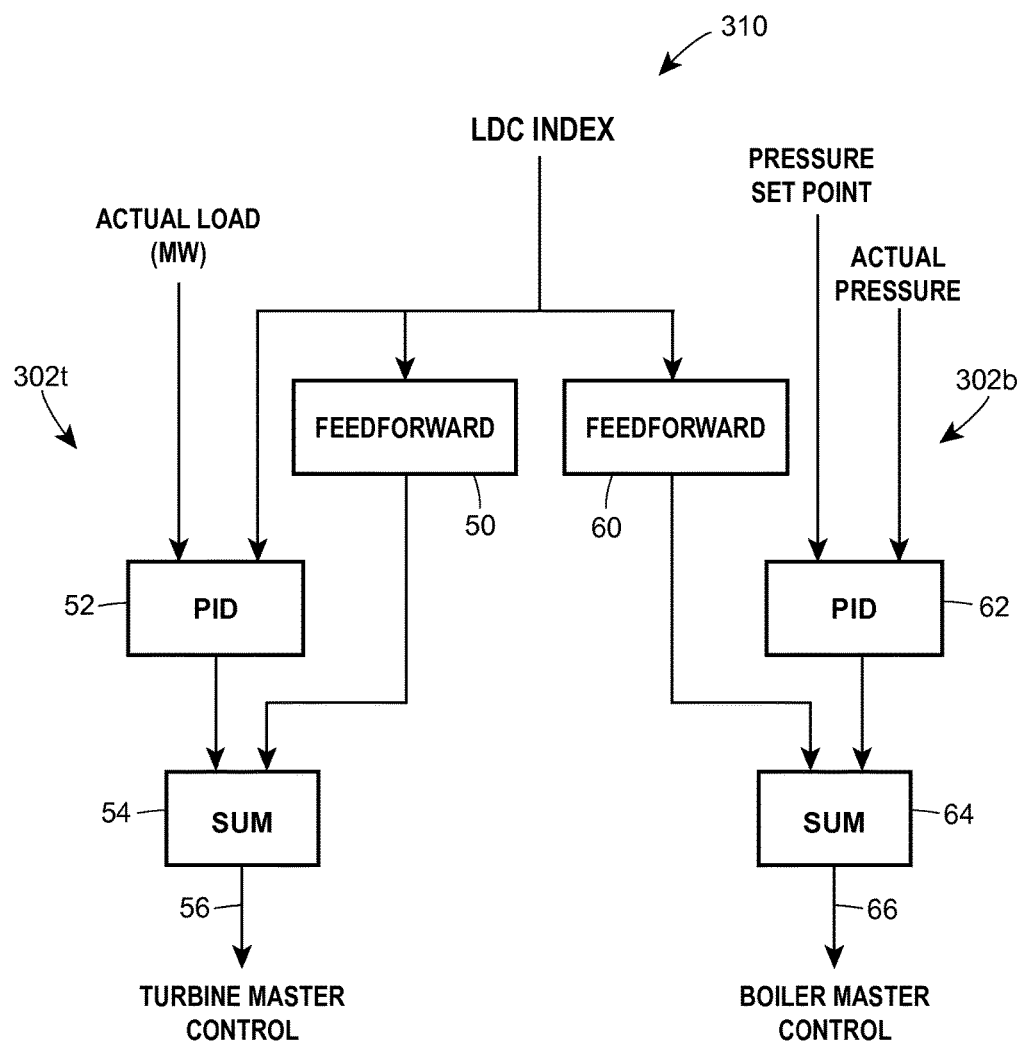
FIG. 5 illustrates an example block diagram of an arrangement that may be used as part of Proportional-Integral-Derivative (PID) control to control a power generating unit.

With regard to the PID control entities or paths 302*t* and 302*b* of FIG. 4, an example PID control arrangement 310 corresponding thereto is shown in FIG. 5. In an embodiment, both of the PID control apparatuses, entities, paths, or routines 302*t* and 302*b* illustrated in FIG. 5 may be activated in the PID control arrangement 310. In an embodiment, only one of the PID control apparatuses, entities, paths, or routines 302*t* and 302*b* is activated in the PID control arrangement 310. Of course, the PID control arrangement 310 shown in FIG. 5 is not the only PID control arrangement that may be used in conjunction with the turbine master 24 and the boiler master 26 of FIG. 4. Generally, any suitable PID control strategy or entity may be used for control of the turbine master 24, the boiler master 26, or both the turbine master 24 and the boiler master 26, and may be correspondingly activated by the switches 305*t* and 305*b*.

In the embodiment illustrated in FIG. 5, the plant 14 may activate PID control for the turbine master 24, the boiler master 26, or both the turbine master 24 and the boiler master 26 (e.g., by configuring the switches 305*t*, 305*b* accordingly). Upon activation of PID control, the LDC index produced by the LDC 22 may be used in the two separate control paths 302*t* and 302*b*, with the first control path 302*t* being responsible for producing a control signal corresponding to the turbine master control unit 24 of FIG. 4 and the second control path 302*b* being responsible for producing a boiler master control signal corresponding to the boiler master control unit 26 of FIG. 4. In some embodiments, PID control may be activated in both the turbine master 24 and in the boiler master 26. In some embodiments, PID control may be activated in only one of the turbine master 24 or the boiler master 26.

As shown in FIG. 5, in an embodiment, the LDC index may be provided to both a feedforward controller 50 and a feedback controller 52 in the turbine control path 302*t* which, in this case, are connected in a boiler follow mode although the well-known turbine follow mode of control could be used instead. In this case, the feedback controller 52 may be indicated as being a PID controller although other types of controllers could be used instead. Generally speaking, the feedback controller 52 may compare the actual load currently being produced (e.g., in megawatts or in percentage of capacity) to the LDC index (which may also be in megawatts or percentage capacity) to produce an error signal (not shown), in an embodiment. The PID controller 52 may use the error signal to produce a first turbine control signal which may be provided to a signal combiner shown as a summer 54. The feedforward controller 50 may operate on the LDC index and may produce a feed forward control signal which may be also provided to the summer 54. The feedback control signals (from the PID controller 52) and the feedforward control signal (from the controller 50) may be combined in the summer 54 to produce a turbine master control signal 56, in an embodiment. In one example, the summer 54 may operate to sum the feedforward and feedback control signals and to scale the summed signal if necessary to produce an appropriate master control signal for the turbine system. The master control signal may be provided to the turbine valves 28, to the bypass valves 30, and/or to additional entities within the plant 12.

In some embodiments of the PID control path 302*t* (not shown), the feed forward controller 50 may be omitted so that the output of the PID 52 is equivalent to the turbine master control signal 56.

In a similar manner, the LDC index may be provided to a feed forward controller 60 associated with the boiler control path 302*b*, while a feedback controller 62 (illustrated as a PID controller) in the path 302*b* receives a pressure set point and an indication of the actual measured pressure within the boiler, in an embodiment. The PID controller 62 may compare, for example, the actual measured pressure in the boiler to the pressure set point, and may produce a feedback control signal using any known PID control technique. The feedback control signal may be provided to a signal combiner illustrated in FIG. 5 as a summer 64. Likewise, the feed forward controller 60 may use the LDC index to produce a feedforward control signal which may be also provided to the summer 64, in an embodiment. The summer 64 may operate to combine the feedback control signal produced by the PID controller 62 with the feed forward control signal produced by the controller 60 to develop a boiler master control signal 66. Of course, in some embodiments, the summer 64 may perform averaging, or weighted averaging of the two received control signals, and may perform scaling or some other combination procedure, to produce the master boiler control signal 66. The master control signal may be provided to adjust the fuel, air, and/or water flow 32 provided to the plant 12, for example.

In some embodiments of the PID control path 302b (not shown), the feed forward controller 60 may be omitted, so that the output of the PID 62 is equivalent to the boiler master control signal 66.

Figure 6:
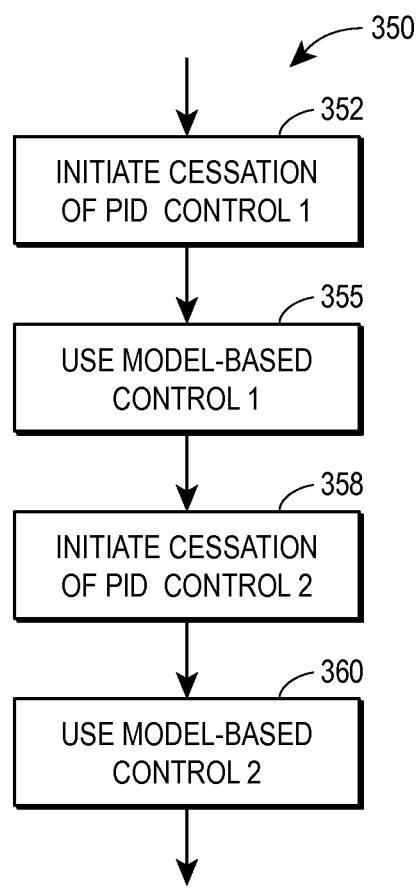
FIG. 6 illustrates an example method of controlling a load of a power generating system.

FIG. 6 illustrates an embodiment of a method 350 for controlling a generated load of a power generating system. The method 350 may be implemented, for example, in the power grid illustrated in FIGS. 1 and 4, such as in one or more of the plants 12, 14, or 16, and the method 350 may be used in conjunction with the dynamic matrix controller 100 of FIG. 2, the PID control arrangement 302t of FIG. 5, and/or the PID control arrangement 302b of FIG. 5. For illustrative and not limiting purposes, the method 350 is described with respect to FIGS. 1-5.

In an embodiment, the method 350 for controlling a load of a power generating system may include initiating a cessation or stopping of PID control 352 of a target entity or apparatus. For example, the target apparatus may be a turbine in the power generating system. As such, the cessation of PID control utilized by the turbine master 24 may be initiated 352 (e.g., by disconnecting the switch 305t from the PID control apparatus or routine 302t). In another example, the target apparatus may be a boiler in the power generating system, and thus, the cessation of PID control utilized by the boiler master 26 may be initiated 352 (e.g., by disconnecting the switch 305b from the PID control apparatus or routine 302b). Of course, other target apparatuses included in the load generating system other than a turbine or a boiler may be operated on (block 352). The cessation of PID control may be initiated 352, for example, as a result of a manual command, or the cessation of PID control may be initiated 352 automatically.

At a block 355, model-based control of the target entity or apparatus may be initiated. For example, if the target entity is a turbine, the turbine master 24 may start using model-based control 355 (e.g., by connecting the switch 305t to the model-based control apparatus or routine 300t), and if the target entity is a boiler, the boiler master 26 may start using model-based control 355 (e.g., by connecting the switch 305b to the model-based control apparatus or routine 300b). Of course, other target apparatuses included in the load generating system other than a turbine or a boiler may be operated on (block 355). In an embodiment, the model-based control 355 may include dynamic matrix control, so that an instance of a DMC such as the DMC 100 is used to perform the model-based control that is initiated for the target entity or apparatus.

In an embodiment, the method 350 for controlling a load of a power generating system may include initiating a cessation or stopping of PID control 358 of a second target entity or apparatus. For example, if the first target apparatus for which PID control was initiated to be ceased at the block 352 is a turbine, then the second target apparatus may be a boiler and PID control at the boiler master 26 may be initiated to be ceased 358. If the first target apparatus for which PID control was initiated to be ceased at the block 352 is a boiler, then the second target apparatus may be a turbine and PID control at the turbine master 24 may be initiated to be ceased 358. Of course, other second target apparatuses included in the load generating system other than a turbine or a boiler may be operated on (block 358). The cessation of PID control may be initiated 358, for example, as a result of a manual command, or the cessation of PID control may be initiated 358 automatically.

At a block 360, model-based control of the second target entity or apparatus may be initiated. For example, if the second target entity is a turbine, the turbine master 24 may start using model-based control, and if the second target entity is a boiler, the boiler master 26 may start using model-based control. Of course, other target apparatuses included in the load generating system other than a turbine or a boiler may be operated on (block 360). In an embodiment, the model-based control 352 may include dynamic matrix control, so that an instance of a DMC such as the DMC 100 is used to perform the model-based control.

In an embodiment, the first and the second target entities may be sequentially activated to use model-based control (e.g., the block 355 occurs before the block 360). The sequential activation may be based on user input, the sequential activation may be automatically performed, or the sequential activation may be performed based on a combination of manual and automatic instructions.

In an embodiment, the power generating system may be switched back to PID control, such as for testing purposes or in other situations. A target entity may be switched from model-based control to PID control using a respective switch. For example, the switch 305t may be switched from activating the model-based control 300t to activate the PID control 302t, or the switch 305b may be switched from activating the model-based control 300b to activate the PID control 302b. In some embodiments, a first target entity (e.g., the turbine or the boiler) may be switched from model-based control to PID control before a second target entity is switched from model-based control to PID control. The switching may be based on user input, the switching may be automatically performed, or the switching may be performed based on a combination of manual and automatic instructions.

Referring simultaneously to FIG. 4, in an illustrative but non-limiting embodiment, a power generating system may include a turbine controlled by a turbine master 24 and a boiler controlled by a boiler master 26, both of which may be individually switched between PID control 302t, 302b and model-based control 300t, 300b. In an initial state, both the turbine master 24 and the boiler master 26 may utilize PID control 302t, 302b to control the load generated by the power generating system. For example, the switches 305t and 305b of FIG. 4 may be configured to activate PID control 302t, 302b so that the turbine master 24 and boiler master 26 may be controlled using a PID control arrangement, such as the arrangement 310 illustrated in FIG. 5.

Cessation of PID control of a first target apparatus (e.g., either the turbine or the boiler, in this illustrative example) may be initiated (block 352), and model-based control may be started or activated (block 358), for example, by configuring a corresponding switch 305t or 305b to activate the respective model-based control 300t or 300b. Accordingly, upon activation of the model-based control 300t or 300b of the first target apparatus, pressure within the power generating system may change. To attain or maintain a desired load as indicated by the load demand index generated by the LDC 22, however, the second target apparatus may be controlled in a model-based manner (blocks 358, 360) based on the model-based of control 300t or 300b of the first target apparatus.

For example, when the first target apparatus or entity is the turbine, corresponding turbine and/or bypass valves 28, 30 may be controlled in a model-based manner 300t to be more open or more closed based on the load demand index 102a. As a result, throttle pressure in the system may change. For example, if turbine valves are controlled to be more closed, pressure at or corresponding to the boiler may increase, and if turbine valves are controlled to be more open, pressure at or corresponding to the boiler may decrease. If the boiler is still operating under PID control 302b, though, the response to the changed pressure may be markedly sluggish as compared to the quicker acting model-based control 300t of the turbine. Accordingly, PID control 302t of the boiler may be ceased or initiated to be ceased (block 358), and model-based control 300b may be initiated for the boiler (block 360). In response to the changed pressure, the model-based control 300b of the boiler 26 initiated at the block 360 may more efficiently and quickly control the boiler by controlling a fan 34, a mill 36, a pump 38, a valve 40, and/or an amount of fuel, air or water 32 delivered to the boiler to generate the desired load.

In a second example, when the first target apparatus or entity is the boiler, an amount of fuel 32 delivered to the boiler may be controlled in a model-based manner 300b to change based on the load demand index 102a. As a result, pressure in the system may change. For example, if additional fuel is delivered to the boiler, pressure at or corresponding to the turbine may increase, and if the amount of fuel delivered to the boiler is decreased, pressure at or corresponding to the turbine may decrease. If the turbine is still operating under PID control 302t, though, the response to the changed pressure may be markedly sluggish as compared to the quicker acting model-based control 300b of the boiler. As such, PID control 302t of the turbine may be ceased or initiated to be ceased (block 358), and model-based control 300t may be initiated for the turbine (block 360). In response to the changed pressure, the model-based control 300t of the turbine initiated at the block 360 may more efficiently and quickly control the turbine by controlling one or more turbine valves 28 and/or one or more bypass valves 30 to generate the desired load.

In some embodiments of the method 350, the blocks 358 and 360 may be optional. For instance, the method 350 may include switching only a first portion the load or power generating system from PID control to model-based control (e.g., blocks 352, 355) and not a second portion (e.g., blocks 358, 36). Typically, but not necessarily, embodiments of the method 350 that omit the blocks 358 and 360 may occur when the second target apparatus or entity is not switchable between PID control and model-based control (for example, a target apparatus that does not support PID control at all), or during a testing situation.

In some embodiments of the method 350, the blocks 352 and 360 may be optional. For example, some load or power generating systems, such as non-legacy systems, may not utilize PID control for various entities, apparatuses or sections, and instead may utilize only model-based control for the various entities, apparatuses or sections. In these systems, a first entity, apparatus or section may be controlled using first model-based control (block 355), and a second entity, apparatus or section may be controlled using second model-based control (block 360) that is based on the first model-based control. For example, a turbine master 24 may include the first model-based control 300t, and the boiler master 26 may include second model-based control 300b whose respective model(s) 110 are based at least partially on the first model-based control 300t. In another example, a boiler master 26 may include first model-based control 300b, and the turbine master 24 may include second model-based control 300t whose respective model(s) 110 are based at least partially on the first model-based control 300b. In an embodiment, the one or more models 110 used by the second model-based control may be generated based on parametric testing of the system while the first model-based control is in operation.

Figure 7:
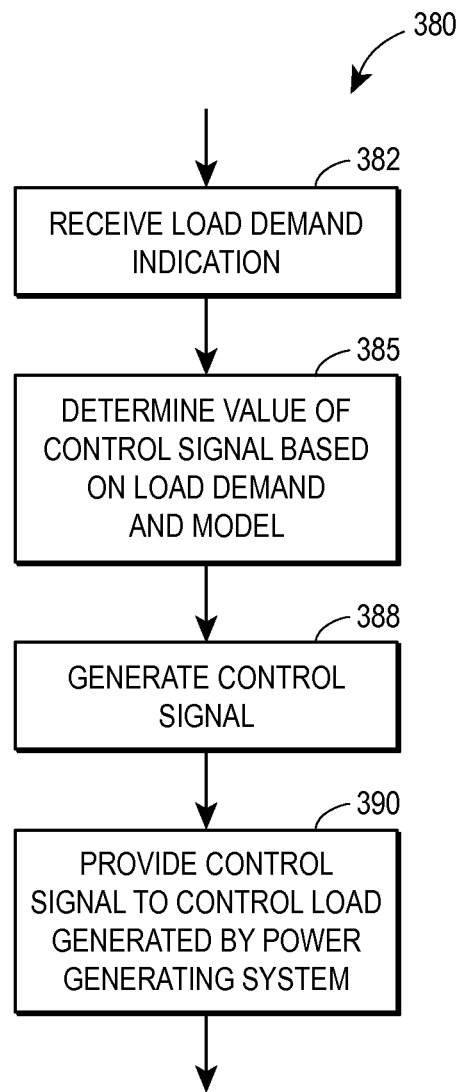
FIG. 7 illustrates an example method of controlling a load generated by a power generating system.

FIG. 7 illustrates an embodiment of a method 380 for controlling a load of a power generating system. The method 380 may be implemented, for example, in the power grid illustrated in FIGS. 1 and 4, such as in one or more of the plants 12, 14, or 16. The method 380 may be used in conjunction with the dynamic matrix controller 100 of FIG. 2 and/or with the PID control arrangement 302t of FIG. 5. The method 380 may be used in conjunction with the method 350 of FIG. 6. For example, the method 380 may be used in conjunction with the block 355 and/or the block 360 of the method 350. In some embodiments, the method 380 may be used in conjunction with a method of controlling a load generated by a system other than the method 350, or the method 380 may be a stand-alone method. For illustrative and not limiting purposes, the method 380 is described with respect to FIGS. 1-5.

The method 380 may include receiving (block 382) a signal indicative of a load demand at an input of a dynamic matrix controller. For example, a signal generated by the load demand controller 22 may be received 382 at the input 102a of the DMC 100. In some embodiments, one or more additional signals may be received at one or more other inputs of the dynamic matrix controller, such as a signal indicative of a current value of a process variable 102b, a signal indicative of a setpoint 102c of the process variable, a signal indicative of a current value of a manipulated variable 102d, a signal indicative of a current value of a disturbance variable 102e, and/or some other signal 102f.

The dynamic matrix controller may determine (block 385) a value of a control signal based on the value of the load demand signal. In an embodiment, the dynamic matrix controller may determine the value of the control signal by using a dynamic matrix control routine 105 and/or by using one or more appropriate models 110, in a manner such as previously discussed. In embodiments of the method 380 where one or more additional signals are received in addition to the load demand signal, the dynamic matrix controller may determine the value of the control signal further based on the one or more additional signals.

At block 388, the dynamic matrix controller may generate a control signal. For example, the dynamic matrix controller 100 may generate the control signal 108.

At block 390, the dynamic matrix controller may control the load generated by the power or load generating system based on the control signal. For example, the control signal 108 may be provided to control one or more valves 28, 30, or 40, an amount of fuel, air, and/or water delivered to a boiler 32, one or more fans 34, one or more mills 36, one or more pumps 38, and/or one or more other controlled entities or apparatuses that are included in the power or load generating system and that influence the generated load.

An embodiment of the method 380 may be utilized by a power or load generating system that includes at least two dynamic matrix controllers, where one of the at least two dynamic matrix controllers is configured to control a first entity, apparatus or section of the power or load generating system, and another one of the at least two dynamic matrix controllers is configured to control a second entity, apparatus or section of the power or load generating system. For example, a first dynamic matrix controller may control a turbine, and a second dynamic matrix controller may control a boiler.

In this embodiment, a first instance of the method 380 may be executed with respect to the first dynamic matrix controller, and a second instance of the method 380 may be executed with respect to the second dynamic matrix controller. In particular, the first dynamic matrix controller may receive a signal indicative of a first process variable corresponding to the first section of the power or load generating system (block 382). The first dynamic matrix controller may determine (block 385) a value of a first control signal based on a signal indicative of the load demand, the signal indicative of a first process variable, and any other additional received signals (e.g., setpoint of process variable, current manipulated variable value, current disturbance variable value, etc.), and the first dynamic matrix controller may generate the first control signal (block 388).

A second dynamic matrix controller may receive the signal indicative of the load demand and a signal indicative of the first process variable or a second process variable corresponding to the second section of the power or load generating system (block 382). The second dynamic matrix controller may determine (block 385) a value of a second control signal based on signal indicative of the load demand, the signal indicative of the first process variable or the second process variable, and any other additional received signals (e.g., setpoint of process variable, current manipulated variable value, current disturbance variable value, etc.). The second dynamic matrix controller may generate a second control signal (block 388). The second control signal may be provided to the power or load generating system (block 390) to control the load generated by the system in conjunction with the first control signal generated by the first dynamic matrix controller (block 385).

Figure 8:
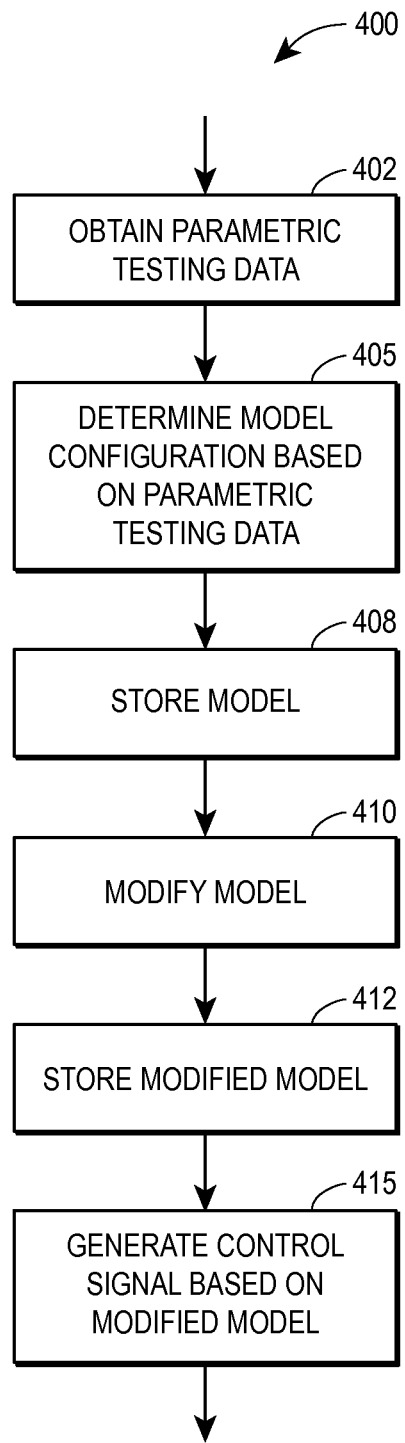
FIG. 8 illustrates an embodiment of a method for generating a model for use in model-based control of a power generating system.

FIG. 8 illustrates an embodiment of a method 400 for generating a model for use in model-based control of a power generating system. The method 400 may be executed, for example, in conjunction with the power grid illustrated in FIGS. 1 and 4, such as in one or more of the plants 12, 14, or 16. The method 400 may be executed in conjunction with the dynamic matrix controller 100 of FIG. 2. In an embodiment, the method 400 may be used to generate the one or more models 110 of FIG. 2 or the example model 202 illustrated in FIG. 3.

In some embodiments, the method 400 may be used in conjunction with the method 350 and/or with the method 380 of FIG. 7. For example, the method 400 may be pre-pended and/or appended to the method 350, and the method 400 may be pre-pended and/or appended to the method 380. In some embodiments, the method 380 may be used in conjunction with a method of controlling a load generated by a system other than the methods 350 and 380. For illustrative and not limiting purposes, though, the method 380 is described below with respect to FIGS. 1-5.

At block 402, parametric testing data may be obtained or received. The parametric testing data may be generated or obtained using techniques such as previously described with respect to FIG. 3, and the parametric data may be stored at a data storage device, such as in the memory 112, in a different local data storage area, or at a remote storage device (not shown). In an embodiment, the parametric testing data may be retrieved from or received from the data storage device.

At block 405, one or more models may be determined, configured, and/or generated based on the obtained parametric testing data. In an embodiment, a different model may be determined for different ranges of initial steady-state loads, for different levels or types of system changes, or for different process responses.

At block 408, the one or more determined or generated models may be stored so that the model(s) are locally or remotely accessible to the dynamic matrix controller 100 and/or to the dynamic matrix control routine 105. In an embodiment, the one or more models may be stored in the memory 112. In an embodiment, a first portion of the one or more models may be stored locally (e.g., as the model 110), and a second portion of the one or more models may be stored remotely at a networked data storage device (not shown).

The method 400 may include optional blocks 410-415. At block 410, the stored model(s) may be modified, updated or replaced. For example, at least a portion of the one or more of the stored models may be modified or updated in real-time, or one or more of the models may be automatically modified based on data obtained in real-time. In another example, one or more of the stored models may be replaced or at least partially updated at a determined time interval. In other examples, one or more of the stored model(s) may be replaced or at least partially updated based on additional data when a threshold is reached, or when a user request to replace or update the model(s) is received. The modified model(s) may be stored so that the modified model(s) are locally or remotely accessible to the dynamic matrix controller 100 and/or to the dynamic matrix control routine 105.

At block 415, a subsequent, updated control signal may be generated based on the one or more modified models. For example, the dynamic matrix controller 100 may generate a subsequent, updated control signal 108 based on the modified model(s) and the load demand index 102a to control the load generated by the power generating system.

While the forgoing description of dynamic matrix control of a load has been described in the context of controlling a power generating plant and, in particular, a boiler and turbine operated power generating plant, these model-based control techniques can be used in other process control systems, such as in industrial process control systems used to control industrial or manufacturing processes. More particularly, this control method may be used in any process plant or control system that receives numerous set point changes and which controls slow reacting equipment. For example, model-based control techniques may be applied to ammonia control for $NO_x$ (nitric oxide and nitrogen dioxide) reduction, drum level control, furnace pressure control, and/or flue gas desulphurization, to name a few.

Furthermore, although the forgoing text sets forth a detailed description of numerous different embodiments of the invention, it should be understood that the scope of the invention may be defined by the words of the claims set forth at the end of this patent and their equivalents. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent, which would still fall within the scope of the claims defining the invention. By way of example, and not limitation, the disclosure herein contemplates at least the following aspects:

1. A method of controlling a load generated by a power generating system, including receiving a signal indicative of a load demand at an input of a dynamic matrix controller; determining, by the dynamic matrix controller, a value of a control signal based on the signal indicative of the load demand and a model stored in a memory of the dynamic matrix controller; generating, by the dynamic matrix controller, the control signal; and controlling the load generated by the power generating system based on the control signal.

2. The method of the preceding aspect, further including receiving a signal indicative of a setpoint of a process variable used in the power generating system and a signal indicative of a current value of the process variable at additional inputs of the dynamic matrix controller; and wherein determining the value of the control signal is further based on the signal indicative of the setpoint of the process variable and the signal indicative of the current value of the process variable.

3. The method of any of the preceding aspects, wherein the process variable is a first process variable corresponding to a first section of the power generating system, the dynamic matrix controller is a first dynamic matrix controller, the model is a first model, and the control signal is a first control signal; and the method further includes receiving the signal indicative of the load demand, a signal indicative of a setpoint of a second process variable corresponding to a second section of the power generating system, and a signal indicative of a current value of the second process variable at inputs of a second dynamic matrix controller;

determining, by the second dynamic matrix controller, a value of a second control signal based on the signal indicative of the load demand, the signal indicative of the setpoint of the second process variable, the signal indicative of the current value of the second process variable, and a second model stored in a memory of the second dynamic matrix controller;

generating, by the second dynamic matrix controller, the second control signal; and controlling the load of the power generating system based on the first control signal and on the second control signal.

4. The method of any of the preceding aspects, wherein the first section of the power generating system corresponds to one of a turbine or a boiler, and wherein the second section of the power generating system corresponds to the other one of the turbine or the boiler.

5. The method of any of the preceding aspects, wherein one of the first process variable or the second process variable corresponds to a throttle pressure within the power generating system, and the other one of the first process variable or the second process variable corresponds to an amount of fuel delivered to the power generating system.

6. The method of any of the preceding aspects, wherein determining the value of the control signal is further based on an additional signal that is indicative of a current value of a disturbance variable and that is received at a respective input of the dynamic matrix controller.

7. The method of any of the preceding aspects, wherein determining the value of the control signal based on the additional signal indicative of the current value of the disturbance variable includes determining the value of the control signal based on a signal indicative of at least one of an amount of soot, a steam temperature, or an amount of burner tilt.

8. The method of any of the preceding aspects, further including determining at least a portion of a configuration of the model based on parametric testing of at least a part of the power generating system, and storing the model in the memory of the dynamic matrix controller.

9. The method of any of the preceding aspects, further including modifying the model, storing the modified model in the memory of the dynamic matrix controller, generating a subsequent control signal based on the modified model, and controlling the load of the power generating system based on the subsequent control signal.

10. The method of any of the preceding aspects, wherein determining the value of the control signal based on the model stored in the memory of the dynamic matrix controller includes determining the value of the control signal based on a model that is stored in the memory of the dynamic matrix controller and that defines a relationship between a process variable, a manipulated variable, and the load demand.

11. The method of controlling a load of a power generating system, including any of the preceding aspects, and including generating, by a first dynamic matrix controller, a first control signal based on a load demand and a first model stored in a memory of the first dynamic matrix controller;

generating, by a second dynamic matrix controller, a second control signal based on the load demand and a second model stored in a memory of the second dynamic matrix controller; and controlling the load of the power generating system based on the first control signal and on the second control signal.

12. The method of any of the preceding aspects, wherein controlling the load of the power generating system based on the first control signal and on the second control signal includes controlling one of a throttle pressure within the power generating system or an amount of fuel delivered to the power generating system based on the first control signal, and controlling the other one of the throttle pressure within the power generating system or the amount of fuel delivered to the power generating system based on the second control signal.

13. The method of any of the preceding aspects, wherein generating the first control signal is further based on a first variable corresponding to a first section of the power generating system, and generating the second control signal is further based on a second variable corresponding to a second section of the power generating system.

14. The method of any of the preceding aspects, wherein generating the first control signal based on the first variable corresponding to the first section of the power generating system includes generating the first control signal based on the first variable corresponding to one of a turbine or a boiler of the power generating system; and generating the second control signal based on the second variable corresponding to the second section of the power generating system includes generating the second control signal based on the second variable corresponding to the other one of the turbine or the boiler of the power generating system.

15. The method of any of the preceding aspects, further including initiating a cessation of a PID (Proportional-Integral-Derivative) control routine within the power generating system, wherein the PID control routine is based on the first variable; and wherein generating, by the first dynamic matrix controller, the first control signal based on the first variable occurs after the cessation of the PID control routine based on the first variable has been initiated.

16. The method of any of the preceding aspects, further including receiving a signal indicative of a current value of the first variable and a signal indicative of a desired value of the first variable at the first dynamic matrix controller, and receiving a signal indicative of a current value of the second variable and a signal indicative of a desired value of the second variable at the second dynamic matrix controller; and wherein generating the first control signal further based on the first variable includes generating the first control signal based on the signal indicative of the current value of the first variable and the signal indicative of the desired value of the first variable in conjunction with the load demand and the first model, and generating the second control signal further based on the second variable includes generating the second control signal based on the signal indicative of the current value and the signal indicative of the desired value of the second variable in conjunction with the load demand and the second model.

17. The method of any of the preceding aspects, wherein the first variable is a first process variable, the second variable is a second process variable, and at least one of:

generating the first control signal is further based on a signal indicative of a current value of a first disturbance variable received at the first dynamic matrix controller;

generating the first control signal is further based on a signal indicative of a current value of a first manipulated variable received at the first dynamic matrix controller;

generating the second control signal is further based on a signal indicative of a current value of a second disturbance variable received at the second dynamic matrix controller; or generating the second control signal is further based on a signal indicative of a current value of a second manipulated variable received at the second dynamic matrix controller.

18. The method of any of the preceding aspects, further including at least one of:

modifying the first model, storing the modified first model in the memory of the first dynamic matrix controller, generating an updated first control signal based on the modified first model, and controlling the load of the power generating system based on the updated first control signal; or modifying the second model, storing the modified second model in the memory of the second dynamic matrix controller, generating an updated second control signal based on the modified second model, and controlling the load of the power generating system based on the updated second control signal.

19. The method of any of the preceding aspects, further including at least one of:

obtaining first parametric data corresponding to the power generating system and generating the first model based on the first parametric data; or obtaining second parametric data corresponding to the power generating system and generating the second model based on at least one of the first parametric data or the second parametric data.

20. A power generating system, including a dynamic matrix controller having an input to receive a signal indicative of a load demand for the power generating system, a memory storing a model, a dynamic matrix control routine configured to determine a value of a control signal based on the model and a value of the load demand, and an output to provide the control signal to control a load generated by the power generating system.

21. The power generating system of any of the preceding aspects, wherein the input is a first input; the dynamic matrix controller further includes a second input to receive a signal indicative of a current value of a process variable used in the power generating system and a third input to receive a desired value of the process variable; and the dynamic matrix control routine is configured to determine the value of the control signal based on the model, the value of the load demand, the current value of the process variable, and the desired value of the process variable.

22. The power generating system of any of the preceding aspects, wherein the dynamic matrix control routine is configured to determine the value of the control signal based on the model, the value of the load demand, the current value of the process variable, the desired value of the process variable, and a current value of a disturbance variable used in the power generating system.

23. The power generating system of any of the preceding aspects, wherein the current value of the disturbance variable corresponds to at least one of: an amount of soot blowing, a steam temperature, or an amount of burner tilt.

24. The power generating system of any of the preceding aspects, wherein the dynamic matrix controller is a first dynamic matrix controller, the process variable is a first process variable, the dynamic matrix control routine is a first dynamic matrix control routine, and the control signal is a first control signal; and wherein the power generating system further includes a second dynamic matrix controller, the second dynamic matrix controller including a first input to receive a signal indicative of a current value of a second process variable used in the power generating system, a second input to receive a signal indicative of a desired value of the second process variable, a third input to receive the signal indicative of the load demand, a memory storing a second model, a second dynamic matrix control routine configured to determine a value of a second control signal based on the second model, the value of the load demand, the current value of the second process variable, and the desired value of the second process variable, and an output to provide the second control signal to control the load of the power generating system in conjunction with the first control signal.

25. The power generating system of any of the preceding aspects, wherein the first dynamic matrix controller and the second dynamic matrix controller are sequentially activated.

26. The power generating system of any of the preceding aspects, wherein a sequential activation of the first dynamic matrix controller and the second dynamic matrix controller is based on user input.

27. The power generating system of any of the preceding aspects, further including a turbine and a boiler in fluid connection with the turbine; and wherein the control signal is provided by the output of the dynamic matrix controller to control one of a throttle pressure of the turbine or an amount of fuel delivered to the boiler.

28. The power generating system of any of the preceding aspects, wherein the control signal is provided by the output of the dynamic matrix controller to control at least one of a valve, a fan, a mill, or a pump corresponding to the one of the throttle pressure of the turbine or the amount of fuel delivered to the boiler.

29. The power generating system of any of the preceding aspects, further including a switch for indicating the one of the throttle pressure of the turbine or the amount of fuel delivered to the boiler is to be controlled by the control signal provided by the output of the dynamic matrix controller, or for indicating the one of the throttle pressure of the turbine or the amount of fuel delivered to the boiler is to be controlled by a control signal provided by a Proportional-Integral-Derivative (PID) control entity.

30. The power generating system of any of the preceding aspects, wherein the dynamic matrix controller is a first dynamic matrix controller, the model is a first model, and the control signal is a first control signal; and the power generating system further includes a second dynamic matrix controller having an output providing a second control signal to control the other one of the throttle pressure of the turbine or the amount of fuel delivered to the boiler, the second control signal being based on a second model stored in a memory of the second dynamic matrix controller.

31. The power generating system of any of the preceding aspects, wherein the model stored in the memory of the dynamic matrix controller is configured based on parametric testing.

32. The power generating system of any of the preceding aspects, wherein the model stored in the memory of the dynamic matrix controller is modifiable in real-time.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

What is claimed is:

1. A method of controlling a load generated by a power generating system, comprising:
   receiving, at inputs of a first dynamic matrix controller, a signal indicative of a current value of a first process variable used in a first section of the power generating system and a signal indicative of a target load demand, the first section of the power generating system corresponding to one of a turbine or a boiler;
   determining, by the first dynamic matrix controller, a value of a first control signal by inputting a value of the target load demand and the current value of the first process variable into a model stored in a memory of the first dynamic matrix controller, the model being descriptive of a behavior of a process response at various values of load demands;
   generating, by the first dynamic matrix controller, the first control signal; and
   controlling the load generated by the power generating system based on the first control signal and a second control signal generated by a second dynamic matrix controller based on a current value of a second process variable used in a second section of the power generating system and the target load demand, the second section of the power generating system corresponding to the other one of the turbine or the boiler.

2. The method of claim 1:
   further comprising receiving a signal indicative of a setpoint of the first process variable used in the first section of the power generating system; and
   wherein determining the value of the first control signal is further based on the signal indicative of the setpoint of the first process variable.

3. The method of claim 2, wherein
the method further comprises:
   receiving the signal indicative of the target load demand, a signal indicative of a setpoint of the second process variable corresponding to the second section of the power generating system, and a signal indicative of the current value of the second process variable at inputs of the second dynamic matrix controller;
   determining, by the second dynamic matrix controller, a value of the second control signal by inputting the value of the target load demand into a second model stored in a memory of the second dynamic matrix controller, and by using the signal indicative of the setpoint of the second process variable, the signal indicative of the current value of the second process variable, and the second model; and
   generating, by the second dynamic matrix controller, the second control signal.

4. The method of claim 1, wherein one of the first process variable or the second process variable corresponds to a throttle pressure within the power generating system, and the other one of the first process variable or the second process variable corresponds to an amount of fuel delivered to the power generating system.

5. The method of claim 2, wherein determining the value of the first control signal is further based on an additional signal that is indicative of a current value of a disturbance variable and that is received at a respective input of the first dynamic matrix controller.

6. The method of claim 5, wherein determining the value of the first control signal based on the additional signal indicative of the current value of the disturbance variable comprises determining the value of the first control signal based on a signal indicative of at least one of: an amount of soot, a steam temperature, or an amount of burner tilt.

7. The method of claim 1, further comprising:
   determining at least a portion of a configuration of the model based on parametric testing of at least a part of the power generating system; and
   storing the model in the memory of the first dynamic matrix controller.

8. A method of controlling a load of a power generating system, comprising:
   receiving, at a first dynamic matrix controller, a signal indicative of a current value of a first variable and a signal indicative of a desired value of the first variable, the first variable corresponding to one of a turbine or a boiler of the power generating system;
   receiving, at a second dynamic matrix controller, a signal indicative of a current value of a second variable and a signal indicative of a desired value of the second variable, the second variable corresponding to the other one of the turbine or the boiler of the power generating system;
   generating, by the first dynamic matrix controller, a first control signal based on a target load demand, the signal indicative of current value of the first variable, the signal indicative of the desired value of the first variable, and a first model stored in a memory of the first dynamic matrix controller, the first model being descriptive of a behavior of a process response at various values of load demands;
   generating, by the second dynamic matrix controller, a second control signal based on the target load demand, the signal indicative of the current value of the second variable, the signal indicative of the desired value of the second variable, and a second model stored in a memory of the second dynamic matrix controller; and
   controlling the load of the power generating system based on the first control signal and on the second control signal.

9. The method of claim 8, wherein controlling the load of the power generating system based on the first control signal and on the second control signal comprises:
   controlling one of a throttle pressure within the power generating system or an amount of fuel delivered to the power generating system based on the first control signal, and controlling the other one of the throttle pressure within the power generating system or the amount of fuel delivered to the power generating system based on the second control signal.

10. The method of claim 8,
further comprising initiating a cessation of a PID (Proportional-Integral-Derivative) control routine within the power generating system, wherein the PID control routine is based on the first variable; and
wherein generating, by the first dynamic matrix controller, the first control signal based on the first variable occurs after the cessation of the PID control routine based on the first variable has been initiated.

11. The method of claim 8, wherein the first variable is a first process variable, the second variable is a second process variable, and at least one of:
generating the first control signal is further based on a signal indicative of a current value of a first disturbance variable received at the first dynamic matrix controller;
generating the first control signal is further based on a signal indicative of a current value of a first manipulated variable received at the first dynamic matrix controller;
generating the second control signal is further based on a signal indicative of a current value of a second disturbance variable received at the second dynamic matrix controller; or
generating the second control signal is further based on a signal indicative of a current value of a second manipulated variable received at the second dynamic matrix controller.

12. A power generating system, comprising:
a first dynamic matrix controller including:
respective inputs to receive a signal indicative of a target load demand for the power generating system and a signal indicative of a current value of a first process variable used in one of a turbine or a boiler of the power generating system,
a memory storing a first model, wherein the first model is descriptive of a behavior of a process response at various values of load demands,
a first dynamic matrix control routine configured to determine a value of a first control signal based on the first model, the current value of the first process variable, and a value of the target load demand, and
an output to provide the first control signal to control a load generated by the power generating system; and
a second dynamic matrix controller including:
respective inputs to receive the signal indicative of the target load demand for the power generating system and a signal indicative of a current value of a second process variable used in the other one of the turbine or the boiler of the power generating system,
a memory storing a second model,
a second dynamic matrix control routine configured to determine a value of a second control signal based on the second model, the current value of the second process variable, and the value of the target load demand, and
an output to provide the second control signal to control the load generated by the power generating system in conjunction with the first control signal.

13. The power generating system of claim 12, wherein:
the first dynamic matrix controller further includes a respective input to receive a desired value of the first process variable; and
the first dynamic matrix control routine is configured to determine the value of the first control signal based on the first model, the value of the target load demand, the current value of the first process variable, and the desired value of the first process variable.

14. The power generating system of claim 13, wherein the first dynamic matrix control routine is configured to determine the value of the first control signal based on the first model, the value of the target load demand, the current value of the first process variable, the desired value of the first process variable, and a current value of a disturbance variable used in the power generating system.

15. The power generating system of claim 14, wherein the current value of the disturbance variable corresponds to at least one of: an amount of soot blowing, a steam temperature, or an amount of burner tilt.

16. The power generating system of claim 13, wherein:
the second dynamic matrix controller further includes:
a respective input to receive a signal indicative of a desired value of the second process variable, and
the second dynamic matrix control routine is configured to determine the value of the second control signal based on the second model, the value of the target load demand, the current value of the second process variable, and the desired value of the second process variable.

17. The power generating system of claim 12, wherein the first dynamic matrix controller and the second dynamic matrix controller are sequentially activated.

18. The power generating system of claim 12, wherein the first model stored in the memory of the first dynamic matrix controller is modifiable in real-time.

* * * * *